US012722044B2

(12) United States Patent
Clancy et al.

(10) Patent No.: US 12,722,044 B2
(45) Date of Patent: Sep. 1, 2026

(54) SYSTEM AND METHOD FOR PROVIDING TAILORED THERAPY TO A USER

(71) Applicant: Beats Medical Limited, Dublin (IE)

(72) Inventors: Ciara Clancy, Dublin (IE); Ralph Bird, Dublin (IE)

(73) Assignee: Beats Medical Limited, Dublin (IE)

( * ) Notice: Subject to any disclaimer, the term of this patent is extended or adjusted under 35 U.S.C. 154(b) by 847 days.

(21) Appl. No.: 18/044,569

(22) PCT Filed: Sep. 9, 2021

(86) PCT No.: PCT/EP2021/074778

§ 371 (c)(1),
(2) Date: Mar. 8, 2023

(87) PCT Pub. No.: WO2022/053545

PCT Pub. Date: Mar. 17, 2022

(65) Prior Publication Data

US 2023/0330487 A1 Oct. 19, 2023

(30) Foreign Application Priority Data

Sep. 9, 2020 (EP) .................................... 20195321

(51) Int. Cl.
*A63B 24/00* (2006.01)
*A63B 71/06* (2006.01)
(Continued)

(52) U.S. Cl.
CPC ...... *A63B 24/0075* (2013.01); *A63B 71/0686* (2013.01); *G10L 15/22* (2013.01);
(Continued)

(58) Field of Classification Search
None
See application file for complete search history.

(56) References Cited

U.S. PATENT DOCUMENTS

2010/0135501 A1* 6/2010 Corbett .................. H04S 7/301 381/58
2013/0060166 A1 3/2013 Friedman et al.
(Continued)

*Primary Examiner* — Dmitry Suhol
*Assistant Examiner* — Ishayu Singh
(74) *Attorney, Agent, or Firm* — Lablock & Associates P.C.

(57) ABSTRACT

A system for providing a therapy to a user comprising one or more motion sensors configured to measure motion data during motion of the user, a mobile computing device, connected to or held by the user and connected to the motion sensor to receive motion data, comprising a sensory output device configured to direct the user in the performance of exercises and at least one processor configured to: (a) receive a therapy start signal, (b) receive a baseline user motion level, (c) adjust the sensitivity of the one or more motion sensors according to the baseline user motion level, (d) select an exercise having a difficulty level which matches the baseline user motion level, (e) cause the sensory output device to direct the user to perform the exercise, (f) receive user motion data measured during user performance of the exercise from the one or more motion sensors, (g) use the user motion data to establish a further user motion level, (h) compare the further user motion level with the baseline user motion level, (i) when the further user motion level is equal to or greater than the baseline user motion level, set the baseline user motion level to a higher user motion level and go to (k), (j) when the further user motion level is less than the baseline user motion level, set the baseline user motion level to a lower user motion level and go to (k), (k) when a therapy stop signal is not received, return to (d), (I) when a therapy stop signal is received, record the baseline user motion level and cause the sensory output device to direct the user to stop the therapy the method characterised by the steps of: (m) scanning the mobile computing device to determine the operating system of the mobile computing
(Continued)

device, (n) determining whether each of the one or more sensors is an accelerometer sensor, a gyroscope sensor or a global positioning system sensor, (o) scanning the one or more sensors to determine which of the sensors are currently available to measure motion data of the user, and (p) using determinations from steps (m), (n) and (o) to further calibrate the sensitivity of the one or more motion sensors.

20 Claims, 4 Drawing Sheets

(51) Int. Cl.

| | |
|---|---|
| ***G10L 15/22*** | (2006.01) |
| ***G10L 15/25*** | (2013.01) |
| ***G10L 25/51*** | (2013.01) |
| ***H04R 3/00*** | (2006.01) |
| ***H04R 29/00*** | (2006.01) |

(52) U.S. Cl.

CPC .............. *G10L 15/25* (2013.01); *G10L 25/51* (2013.01); *H04R 3/00* (2013.01); *H04R 29/001* (2013.01); *A63B 2024/0068* (2013.01); *A63B 2071/0625* (2013.01); *A63B 2220/40* (2013.01); *A63B 2220/803* (2013.01); *A63B 2225/02* (2013.01); *A63B 2230/62* (2013.01); *H04R 2430/01* (2013.01)

(56) References Cited

U.S. PATENT DOCUMENTS

| | | | | |
|---|---|---|---|---|
| 2014/0282058 | A1* | 9/2014 | Hui | G06F 9/45533 715/744 |
| 2016/0109973 | A1* | 4/2016 | Kim | G06F 3/04886 345/173 |
| 2016/0270712 | A1 | 9/2016 | Clancy et al. | |
| 2017/0177023 | A1 | 6/2017 | Simon et al. | |
| 2018/0178065 | A1* | 6/2018 | Yu | A61H 3/04 |
| 2019/0134454 | A1 | 5/2019 | Mahoney et al. | |
| 2019/0143174 | A1* | 5/2019 | Park | A63B 24/0062 434/247 |
| 2019/0150826 | A1* | 5/2019 | Rot | G16H 40/63 |
| 2020/0138363 | A1 | 5/2020 | McCarthy et al. | |
| 2020/0237291 | A1* | 7/2020 | Sundaram | A61B 5/4528 |

* cited by examiner

SYSTEM AND METHOD FOR PROVIDING TAILORED THERAPY TO A USER

The present invention relates to a system and method for providing tailored, adaptive therapy to a user thereof, in particular, using data from a mobile computing device. The invention further relates to a system configured to provide tailored, adaptive therapy to users across different mobile operating system platforms.

BACKGROUND TO THE INVENTION

Neurological and central nervous system conditions are typically treated using Allied Health Therapy approaches such as physiotherapy, speech therapy, occupational therapy and psychology. These approaches have been shown to support symptoms of gross motor, fine motor and speech issues.

In the light of the fact that patients suffering from these conditions are so unique, varying not only from one disease to another but also each person with the disease presenting distinctly different to another, programs need to be tailored to the patient initially and also progressively or regressively tailored depending on the patient's performance and needs.

Typical Allied Health therapies involve a clinician performing an initial patient assessment in hospital and providing personalised therapy from a selection of walking programs, metronome therapy, speech therapy and fine motor therapy. The patient is reassessed, for example a week or two later, and therapy is alternated accordingly by progression or regression.

It is an object of the present invention to provide a system and method for providing tailored and progressive allied health therapies for people with neurological and CNS conditions that go at least some way toward reducing the amount of clinician assessment required or at least provide a useful alternative.

SUMMARY OF THE INVENTION

Aspects of the present invention will become apparent from the ensuing description which is given by way of example only.

The present invention relates to the collection, recording and analysing of user data to study the development and treatment of neurological conditions with the aim to improving treatments and identifying potential digital biomarkers.

According to a first aspect of the invention there is provided a system for providing a therapy to a user comprising: one or more motion sensors configured to measure motion data during motion of the user, a mobile computing device, connected to or held by the user and connected to the motion sensor to receive motion data, comprising a sensory output device configured to direct the user in the performance of exercises and at least one processor configured to:

(a) receive a therapy start signal, (b) receive a baseline user motion level, (c) adjust the sensitivity of the one or more motion sensors according to the baseline user motion level, (d) select an exercise having a difficulty level which matches the baseline user motion level, (e) cause the sensory output device to direct the user to perform the exercise, (f) receive user motion data measured during user performance of the exercise from the one or more motion sensors, (g) use the user motion data to establish a further user motion level, (h) compare the further user motion level with the baseline user motion level, (i) when the further user motion level is equal to or greater than the baseline user motion level, set the baseline user motion level to a higher user motion level and go to (k), (j) when the further user motion level is less than the baseline user motion level, set the baseline user motion level to a lower user motion level and go to (k), (k) when a therapy stop signal is not received, return to (d), (l) when a therapy stop signal is received, record the baseline user motion level and cause the sensory output device to direct the user to stop the therapy, the method characterised by the steps of:

(m) scanning the mobile computing device to determine the operating system of the mobile computing device, (n) determining whether each of the one or more sensors is an accelerometer sensor, a gyroscope sensor or a global positioning system sensor, (o) scanning the one or more sensors to determine which of the sensors are currently available to measure motion data of the user, and (p) using determinations from steps (m), (n) and (o) to further calibrate the sensitivity of the one or more motion sensors.

The system according to the present invention facilitates the delivery of products across mobile devices irrespective of the underlying mobile platform and device type, where multiple different sensors may be available and/or where the device's sensors may not behave the same. The system is thus configured to deliver therapy to a user whether the device is an iOS or Android device (or indeed some other device running an alternative mobile platform).

The mobile computing device may be a smart phone device, tablet, laptop or other computing device.

As a preliminary step, a scan by the system is performed to determine the operating system of the mobile computing device.

A determination is also made as to what sensors are and are not available for the device to enable the system to identify the sensors that are available and the sensor capabilities to provide the therapy. Accordingly, a scan of the device sensors is completed to identify what is available on the device, such as one or more of a: gyroscope, pedometer, altimeter, accelerometer and/or a global positioning sensor. The system can be configured with greater sensitivity depending on the availability of more sensors.

The system uses high-rate data from one or more of the following sensors: accelerometer, gyroscope device motion (gravity, user acceleration, rotation rate, altitude), pedometer, altimeter and/or GPS location including heading and velocity.

The system calibrates the sensitivity of the sensors accordingly so that the system may deliver tailored therapy in a standardised way and be comparable across devices whether it be iOS or Android or other mobile platform operating system.

Selecting the exercise having a difficulty level which matches the baseline user motion level may comprise selecting a gait exercise having a difficulty level which matches the baseline user motion level comprising a baseline average step frequency of the user.

Causing the sensory output device to direct the user to perform the exercise may comprise causing the sensory output device to play an exercise file for the gait exercise to the user. Playing the exercise file may comprise playing a plurality of instructions to direct the user to perform the gait exercise. Playing the exercise file may comprise providing motivational instructions to the user. Playing the exercise file may comprise providing one or more prompts to user. The one or more prompts may comprise telling the user to place the mobile computing device in a trouser pocket for gait exercises. This prompt may be provided if it is detected that the user does not have the mobile computing device in a trouser pocket.

The plurality of instructions to direct the user to perform the gait exercise may comprise a start instruction to direct the user to start the gait exercise. The plurality of instructions to direct the user to perform the gait exercise may comprise an end instruction to direct the user to end the gait exercise. The start instruction and the end instruction may comprise any of audio instructions, vibration instructions, visual instructions.

The plurality of instructions to direct the user to perform the gait exercise may comprise instructions directing the user to perform a walk for a specified time period. The time period may comprise any of 1 min, 2 min, 3 min.

The instructions to perform the walk for a specified time period may comprise audio cues provided to the user during the walk. The audio cues may have a frequency equal to the baseline average step frequency of the user. The audio cues may be provided by an audio output device of the sensory output device of the mobile computing device.

The audio cues may be provided by generating an audio cue file comprising audio cues having a frequency equal to the baseline average step frequency of the user. Generating the audio cue file may comprise playing a single audio cue on a loop at a frequency equal to the baseline average step frequency of the user. The audio cue file may be generated by the mobile computing device or by a remote computing device to which the baseline average step frequency of the user has been transmitted.

The audio cues may be provided by selecting an audio cue file comprising audio cues having a frequency equal to the baseline average step frequency of the user. Selecting the audio cue file may comprise selecting the file from a plurality of audio cue files comprising audio cues having different pre-defined frequencies. The plurality of audio cue files may comprise audio cues having different pre-defined frequencies in the range of 5 beats per minute to 300 beats per minute. The plurality of audio cue files may be stored in a memory device of the mobile computing device. The plurality of audio cue files may be stored in a remote computing device and received by the mobile computing device. The plurality of audio cue files may comprise an MP3 format or other audio file format.

The instructions to walk for a specified time period may comprise vibration cues provided to the user during the walk. The vibration cues may have a frequency equal to the baseline average step frequency of the user. The vibration cues may be provided by causing a vibration output device of the sensory output device of the mobile computing device to vibrate at a frequency equal to the baseline average step frequency of the user.

The audio cue file and the vibration cue file is used to tailor and then adapt the speed and intensity of walking of the user.

The instructions to walk for a specified time period may comprise visual cues provided to the user during the walk. The visual cues may comprise visual images generated during the walk. The visual cues may be provided by a visual output device of the sensory output device of the mobile computing device.

Receiving the user motion data measured during user performance of the exercise may comprise receiving user gait motion data measured during performance of the walk of the gait exercise.

Using the user motion data to establish the further user motion level may comprise using the user gait motion data to compute gait step data and using the gait step data to establish the further user motion level. The gait step data may measure a further average step frequency of the user. Using the gait step data to establish the further user motion level may comprise setting the further user motion level equal to the further average step frequency of the user. The further average step frequency may be measured in steps per minute.

Comparing the further user motion level with the baseline user motion level may comprise comparing the further average step frequency of the user with a baseline average step frequency of the user.

When the further user motion level is equal to or greater than the baseline user motion level, setting the baseline user motion level to a higher user motion level may comprise setting the baseline average step frequency to a higher average step frequency of the user. Setting the baseline average step frequency to a higher average step frequency may comprise applying a multiplication factor to the baseline average step frequency. The multiplication factor may comprise any of a 5% increase of the baseline average step frequency, a 10% increase of the baseline average step frequency.

Setting the baseline average step frequency of the user to a higher average step frequency of the user increases the difficulty level of the next exercise. The difficulty level of the next exercise is increased in response to the user succeeding in the current exercise, e.g. managing to complete the current exercise without any failures. Thus the therapy provided to the user by the system is tailored to the user and adaptive to the user's performance.

When the further user motion level is less than the baseline user motion level, setting the baseline user motion level to a lower user motion level may comprise setting the baseline average step frequency to a lower average step frequency of the user. Setting the baseline average step frequency to a lower average step frequency may comprise applying a multiplication factor to the baseline average step frequency. The multiplication factor may comprise any of a 5% decrease of the baseline average step frequency, a 10% decrease of the baseline average step frequency.

Setting the baseline average step frequency of the user to a lower average step frequency of the user decreases the difficulty level of the next exercise. The difficulty level of the next exercise is decreased in response to the user not succeeding in the current exercise, e.g. not managing to complete the current exercise without any failures, or not matching steps throughout the exercise, i.e. failures towards the end of the exercise. Thus, again, the therapy provided to the user by the system is tailored to the user and adaptive to the user's performance.

Alternatively, using the user motion data to establish the further user motion level may comprise using the user gait motion data to compute gait step data and gait postural data and using the gait step data to establish a gait step component of the further user motion level and using the gait postural data to establish a gait postural component of the further user motion level. The gait step data may measure any of an average step frequency of the user, an average step length of the user, an average step speed of the user. The gait postural data may measure hip acceleration data and hip rotation data. The hip acceleration data and hip rotation data may provide postural sway data. The hip acceleration data and hip rotation data may provide cyclical gait information. The cyclical gait information may comprise any of step variability between legs, step to step variability of each leg, step changes over time.

Comparing the further user motion level with the baseline user motion level may comprise comparing the gait step component and the gait postural component of the further user motion level with a baseline gait step component and a baseline gait postural component of the baseline user motion level.

When the further user motion level is equal to or greater than the baseline user motion level, setting the baseline user motion level to a higher user motion level may comprise setting the baseline gait step component and the baseline gait postural component to a higher gait step component and a higher gait postural component. Setting the baseline gait step component and the baseline gait postural component to a higher gait step component and a higher gait postural component may comprise applying a multiplication factor to the baseline gait step component and the baseline gait postural component. The multiplication factor may comprise any of a 5% increase of the baseline gait step component and the baseline gait postural component, a 10% increase of the baseline gait step component and the baseline gait postural component.

When the further user motion level is less than the baseline user motion level, setting the baseline user motion level to a lower user motion level may comprise setting the baseline gait step component and the baseline gait postural component to a lower gait step component and a lower gait postural component. Setting the baseline gait step component and the baseline gait postural component to a lower gait step component and a lower gait postural component may comprise applying a multiplication factor to the baseline gait step component and the baseline gait postural component. The multiplication factor may comprise any of a 5% decrease of the baseline gait step component and the baseline gait postural component, a 10% decrease of the baseline gait step component and the baseline gait postural component.

The further user motion level may be used to detect a change in the motion of the user and the detected change of motion used to determine whether the user is suffering from a disease-related motion event. Detecting the change in the motion of the user may comprise detecting a deceleration rate of the motion of the user and comparing the detected deceleration rate to a predetermined deceleration rate range. When the detected deceleration rate falls within the predetermined deceleration rate range the motion of the user relating to the detected deceleration may be recorded.

Receiving the baseline user motion level may comprise receiving a previous user motion level. The previous user motion level may comprise a baseline user motion level of a previous therapy. When the system provides a first therapy of a day, the previous user motion level may comprise a baseline user motion level of a previous therapy on a preceding day. When the system provides a second or subsequent therapy of a day, the previous user motion level may comprise a baseline user motion level of a preceding therapy.

Receiving the baseline user motion level may comprise reading the baseline user motion level of a previous therapy from a memory device of the mobile computing device. Receiving the baseline user motion level may comprise reading the baseline user motion level of a previous therapy from an input device of the mobile computing device.

The previous user motion level may be constrained using clinician-set disease specific parameters. These parameters could be adapted over time based on response of the user to the therapy.

Receiving the baseline user motion level may comprise:

(a) selecting an initial exercise having an initial difficulty level, (b) causing the sensory output device to direct the user to perform the initial exercise, (c) receiving user motion data measured during user performance of the initial exercise from the one or more motion sensors, and (d) using the user motion data to establish the baseline user motion level.

Selecting the initial exercise may comprise selecting an initial gait exercise having an initial difficulty level which matches a previous user motion level. The previous user motion level may comprise a previous average step frequency of the user.

Causing the sensory output device to direct the user to perform the initial exercise may comprise causing the sensory output device to play an exercise file for the initial gait exercise to the user. Playing the exercise file may comprise playing a plurality of instructions to direct the user to perform the initial gait exercise.

The plurality of instructions may comprise a start instruction to direct the user to start the initial gait exercise. The plurality of instructions may comprise an end instruction to direct the user to end the initial gait exercise. The start instruction and the end instruction may comprise any of audio instructions, vibration instructions, visual instructions.

The plurality of instructions may comprise instructions directing the user to perform a walk for a specified time period. The time period may comprise any of 1 min, 2 min, 3 min.

The instructions to perform the walk for a specified time period may comprise audio cues provided to the user during the walk. The audio cues may have a frequency equal to the previous average step frequency of the user. The audio cues may be provided by an audio output device of the sensory output device of the mobile computing device.

The audio cues may be provided by generating an audio cue file comprising audio cues having a frequency equal to the previous average step frequency of the user. Generating the audio cue file may comprise playing a single audio cue file on a loop at a frequency equal to the previous average step frequency of the user. The audio cue file may be generated by the mobile computing device or by a remote computing device to which the previous average step frequency of the user has been transmitted.

The audio cues may be provided by selecting an audio cue file comprising audio cues having a frequency equal to the previous average step frequency of the user. Selecting the audio cue file may comprise selecting the file from a plurality of audio cue files comprising audio cues having different pre-defined frequencies. The plurality of audio cue files may comprise audio cues having different pre-defined frequencies in the range of 5 beats per minute to 300 beats per minute. The plurality of audio cue files may be stored in a memory device of the mobile computing device. The plurality of audio cue files may be stored in a remote computing device and received by the mobile computing device. The plurality of audio cue files may comprise an MP3 format or other audio file format.

The instructions to perform the walk for a specified time period may comprise vibration cues provided to the user during the walk. The vibration cues may have a frequency equal to the previous average step frequency of the user. The vibration cues may be provided by causing a vibration output device of the sensory output device of the mobile computing device to vibrate at a frequency equal to the previous average step frequency of the user.

The instructions to perform the walk for a specified time period may comprise visual cues provided to the user during the walk. The visual cues may comprise visual images generated during the walk. The visual cues may be provided by a visual output device of the sensory output device of the mobile computing device.

Receiving user motion data measured during user performance of the initial exercise may comprise receiving user gait motion data measured during performance of the walk of the initial gait exercise.

Using the user motion data to establish the baseline user motion level may comprise using the user gait motion data to compute gait step data and using the gait step data to establish the baseline user motion level. The gait step data may measure a baseline average step frequency of the user. Using the gait step data to establish the baseline user motion level may comprise setting the baseline user motion level equal to the baseline average step frequency of the user. The baseline average step frequency may be measured in steps per minute.

Alternatively, using the user motion data to establish the baseline user motion level may comprise using the user gait motion data to compute gait step data and gait postural data and using the gait step data to establish a baseline gait step component of the baseline user motion level and using the gait postural data to establish a baseline gait postural component of the baseline user motion level. The gait step data may measure any of an average step frequency of the user, an average step length of the user, an average step speed of the user. The gait postural data may measure hip acceleration data and hip rotation data. The hip acceleration data and hip rotation data may provide postural sway data. The hip acceleration data and hip rotation data may provide cyclical gait information. The cyclical gait information may comprise any of step variability between legs, step to step variability of each leg, step changes over time.

Additionally or alternatively, selecting the exercise having a difficulty level which matches the baseline user motion level may comprise selecting a component of fitness exercise having a difficulty level which matches the baseline user motion level comprising a baseline user component of fitness motion level.

The component of fitness exercise may comprise any of a balance exercise, a flexibility exercise, an endurance exercise, a strength exercise. The balance exercise may comprise a static balance exercise. The static balance exercise may comprise any of standing still for a specified time period with feet together, standing still for a specified time period with one foot in front of the other. The balance exercise may comprise a dynamic balance exercise. The dynamic balance exercise may comprise walking one foot in front of the other e.g. tightrope walking.

Causing the sensory output device to direct the user to perform the exercise may comprise causing the sensory output device to play an exercise file for the component of fitness exercise to the user. Playing the exercise file may comprise playing a plurality of instructions to direct the user to perform the component of fitness exercise. Playing the exercise file may comprise providing motivational instructions to the user. Playing the exercise file may comprise providing one or more prompts to user.

The plurality of instructions to direct the user to perform the component of fitness exercise may comprise a start instruction to direct the user to start the component of fitness exercise. The plurality of instructions to direct the user to perform the component of fitness exercise may comprise an end instruction to direct the user to end the component of fitness exercise. The start instruction and the end instruction may comprise any of audio instructions, vibration instructions, visual instructions.

The plurality of instructions to direct the user to perform the component of fitness may comprise any of audio instructions, vibration instructions, visual instructions.

The plurality of instructions to direct the user to perform the component of fitness exercise may comprise one or more visual cues provided to the user during the component of fitness exercise. The one or more visual cues may comprise one or more visual images illustrating the component of fitness exercise. The one or more visual images may comprise one or more flashcards. The visual cues may be provided by a visual output device of the sensory output device of the mobile computing device.

The plurality of instructions to direct the user to perform the component of fitness exercise may further comprise any of one or more audio cues, one or more vibration cues.

The component of fitness exercise file may be selected from a library of component of fitness exercises which are categorised by difficulty level. The library may be stored in a memory device of the mobile computing device. The library may be stored in a remote computing device and received by the mobile computing device.

The one or more visual, audio and vibration cues are used to tailor and then adapt the difficulty of the component of fitness exercise to the user.

Receiving the user motion data measured during user performance of the exercise may comprise receiving user component of fitness motion data measured during performance of the component of fitness exercise.

Using the user motion data to establish a further user motion level may comprise using the user component of fitness motion data to establish a further user component of fitness motion level.

The user component of fitness motion data may comprise any of hip acceleration data, hip rotation data, sway data, coordination data, flexibility data, endurance data, strength data. The hip acceleration data may be data in both the transverse and vertical planes. The hip rotation data may be data around both the transverse and vertical planes.

Comparing the further user motion level with the baseline user motion level may comprise comparing the further user component of fitness motion level with the baseline user component of fitness motion level.

When the further user motion level is equal to or greater than the baseline user motion level, setting the baseline user motion level to a higher user motion level may comprise setting the baseline user component of fitness motion level to a higher baseline user component of fitness motion level. Setting the baseline user component of fitness motion level to a higher baseline user component of fitness motion level may comprise applying a multiplication factor to the baseline user component of fitness motion level. The multiplication factor may comprise any of a 5% increase of the baseline user component of fitness motion level, a 10% increase of the baseline user component of fitness motion level.

Setting the baseline user component of fitness motion level to a higher baseline user component of fitness motion level increases the difficulty level of the next exercise. The difficulty level of the next exercise is increased in response to the user succeeding in the current exercise, e.g. managing to complete the current exercise without any failures. Thus the therapy provided to the user by the system is tailored to the user and adaptive to the user's performance.

When the further user motion level is less than the baseline user motion level, setting the baseline user motion level to a lower user motion level may comprise setting the baseline user component of fitness motion level to a lower baseline user component of fitness motion level. Setting the baseline user component of fitness motion level to a lower baseline user component of fitness motion level may comprise applying a multiplication factor to the baseline user component of fitness motion level. The multiplication factor may comprise any of a 5% decrease of the baseline user component of fitness motion level, a 10% decrease of the baseline user component of fitness motion level.

Setting the baseline user component of fitness motion level to a lower average step frequency of the user decreases the difficulty level of the next exercise. The difficulty level of the next exercise is decreased in response to the user not succeeding in the current exercise, e.g. not managing to complete the current exercise without any failures. Thus, again, the therapy provided to the user by the system is tailored to the user and adaptive to the user's performance.

Receiving the baseline user motion level may comprise receiving a previous user motion level. The previous user motion level may comprise a baseline user motion level of a previous therapy. When the system provides a first therapy of a day, the previous user motion level may comprise a baseline user motion level of a previous therapy on a preceding day. When the system provides a second or subsequent therapy of a day, the previous user motion level may comprise a baseline user motion level of a preceding therapy.

Receiving the baseline user motion level may comprise reading the baseline user motion level of a previous therapy from a memory device of the mobile computing device. Receiving the baseline user motion level may comprise reading the baseline user motion level of a previous therapy from an input device of the mobile computing device.

Receiving the baseline user motion level may comprise:

(a) selecting an initial exercise having an initial difficulty level,
(b) causing the sensory output device to direct the user to perform the initial exercise,
(c) receiving user motion data measured during user performance of the initial exercise from the one or more motion sensors, and
(d) using the user motion data to establish the baseline user motion level.

Selecting the initial exercise may comprise selecting an initial component of fitness exercise having an initial difficulty level which matches a previous user motion level comprising a previous user component of fitness motion level.

The initial component of fitness exercise may comprise any of a balance exercise, a flexibility exercise, an endurance exercise, a strength exercise. The balance exercise may comprise a static balance exercise. The static balance exercise may comprise any of standing still for a specified time period with feet together, standing still for a specified time period with one foot in front of the other. The balance exercise may comprise a dynamic balance exercise. The dynamic balance exercise may comprise a stretch exercise.

Causing the sensory output device to direct the user to perform the initial exercise may comprise causing the sensory output device to play an exercise file for the initial component of fitness exercise to the user. Playing the exercise file may comprise playing a plurality of instructions to direct the user to perform the initial component of fitness exercise.

The plurality of instructions to direct the user to perform the initial component of fitness exercise may comprise a start instruction to direct the user to start the initial component of fitness exercise. The plurality of instructions to direct the user to perform the initial component of fitness exercise may comprise an end instruction to direct the user to end the initial component of fitness exercise. The start instruction and the end instruction may comprise any of audio instructions, vibration instructions, visual instructions.

The plurality of instructions to direct the user to perform the initial component of fitness may comprise any of audio instructions, vibration instructions, visual instructions.

The plurality of instructions to direct the user to perform the initial component of fitness exercise may comprise one or more visual cues provided to the user during the initial component of fitness exercise. The one or more visual cues may comprise one or more visual images illustrating the initial component of fitness exercise. The one or more visual images may comprise one or more flashcards. The visual cues may be provided by a visual output device of the sensory output device of the mobile computing device.

The plurality of instructions to direct the user to perform the initial component of fitness exercise may further comprise any of one or more audio cues, one or more vibration cues.

The initial component of fitness exercise file may be selected from a library of component of fitness exercises which are categorised by difficulty level. The library may be stored in a memory device of the mobile computing device. The library may be stored in a remote computing device and received by the mobile computing device.

Receiving user motion data measured during user performance of the initial exercise may the initial component of fitness exercise.

Using the user motion data to establish the baseline user motion level may comprise using the user component of fitness motion data to establish the baseline user component of fitness motion level. The user component of fitness motion data may comprise any of hip acceleration data, hip rotation data, sway data, coordination data, flexibility data, endurance data, strength data. The hip acceleration data may be data in both the transverse and vertical planes. The hip rotation data may be data around both the transverse and vertical planes.

Adjusting the sensitivity of the one or more motion sensors according to the baseline user motion level may comprise setting a sensitivity level of the one or more motion sensors to detect motion of the user at the baseline user component of fitness motion level.

The processor of the therapy system may be further configured to select an additional exercise having a difficulty level which does not match the baseline user motion level. The user motion level measured during the additional exercise may be used to check the sensitivity of the one or more motion sensors. The user motion level measured during the additional exercise may be used to adjust the sensitivity of the one or more motion sensors. This provides sense checks of the sensitivity of the motion sensors in case of spontaneous user improvements or changes in sensitivity requirements.

The processor may be further configured to select an additional exercise having a difficulty level which does not match the baseline user motion level. The additional exercise is provided to allow for variation in the exercises of the therapy not according to the user motion level.

The one or more motion sensors may be part of the mobile computing device and configured to measure motion of the mobile computing device and thereby motion of the user. The one or more motion sensors may comprise an accelerometer configured to measure 3-axis acceleration motion of the mobile computing device. The one or more motion sensors may comprise a gyroscope configured to measure rotation motion of the mobile computing device. The one or more motion sensors may be configured to measure motion of the mobile computing device at 100 Hz. The one or more motion sensors may be part of a wristwatch and configured to measure motion of the wristwatch and thereby motion of the user. The one or more motion sensors may be part of one or more ear pods and configured to measure motion of the one or more ear pods and thereby motion of the user.

The mobile computing device may comprise any of a mobile phone, a smart phone, a laptop, a watch, a smart watch, a pedometer.

The mobile computing device may include any of a magnetometer, a pedometer, an altimeter, a location sensor, an iBeacon™ proximity sensor, an Eddystone™ proximity sensor.

The sensory output device may comprise any of an audio output device, a vibration output device, a visual output device. The audio output device may comprise any of a speaker of the mobile computing device, a headphone system coupled to the mobile computing device, a separate audio output device adapted for the user. The vibration output device may comprise a vibration device of the mobile computing device. The visual output device may comprise a screen of the mobile computing device.

The mobile computing device may comprise a transceiver. The transceiver may be configured to receive data from and transmit data to a remote computing device. The data may be received from and transmitted to the remote computer server via a cloud computing network. The remote computing device may be a computer server.

The user motion levels established by the therapy system may be used to develop one or more parameters to be used to study longitudinal user motion levels and user motion level population variation. The one or more parameters may be used to study any of parameter variation at particular instances in time, parameter variation over the duration of an exercise, parameter variation during periods with and without audio cues, walking style variation over time, parameter relationship to a users medical history. The one or more parameters may comprise any of step frequency, step length, step power spectra.

The step frequency may be investigated using a wavelet analysis of user acceleration in the horizontal direction, user acceleration in the vertical direction, user rotation around the horizontal direction and user rotation around the vertical direction. Step frequency and variation of the step frequency may be measured from times between fundamental peaks in the wavelet analysis or from fits to peak locations of the wavelet analysis.

The step power spectra may be investigated using wavelet analysis. This may comprise decomposition of the spectra into time and frequency components. The wavelet analysis may be used to determine any of fundamental frequency (double step) and its variation, first harmonic (single step) and its variation, step patterns such as imbalance in motion between the legs, other prominent harmonics.

The system for providing a therapy to a user may further comprise a sensory input device connected to the mobile computing device and the least one processor of the mobile computing device may be further configured to:

(a) receive a therapy start signal,
(b) receive a baseline user fine motor level,
(c) adjust the sensitivity of the sensory input device according to the baseline user fine motor level,
(d) select an exercise having a difficulty level which matches the baseline user fine motor level,
(e) direct the user to perform the exercise,
(f) receive user fine motor data measured during user performance of the exercise from the sensory input device,
(g) use the user fine motor data to establish a further user fine motor level,
(h) compare the further user fine motor level with the baseline user fine motor level,
(i) when the further user fine motor level is equal to or greater than the baseline user fine motor level, set the baseline user fine motor level to a higher user fine motor level and go to (k),
(j) when the further user fine motor level is less than the baseline user fine motor level, set the baseline user fine motor level to a lower user fine motor level and go to (k),
(k) when a therapy stop signal is not received, return to (d),
(l) when a therapy stop signal is received, record the baseline user fine motor level and cause the sensory output device to direct the user to stop the therapy,
(m) pulsing the mobile computing device to determine a measure of vibration delivery latency of the sensory output device,
(n) determining screen size of the sensory output device and whether single and/or double touch of the screen is required as standard,
(o) using the determinations at (m) and (n) together with the determined operating system of the mobile computing device to further calibrate the sensitivity of the sensory input device.

Accordingly, the system provides initial pulses to identify the mobile devices delivery of vibration to determine whether the sensory output device delivers them at a higher or lower rate than that of a standard device, and the extent of any variation.

The system calibrates the level of vibration delivery accordingly so the prescribed tailored therapy can be delivered and so that outcome measures can be delivered in a standardised way and be comparable across mobile devices, whether it be iOS or Android or other mobile platform.

Selecting the exercise having a difficulty level which matches the baseline user fine motor level may comprise selecting a range of motion exercise having a difficulty level which matches the baseline user fine motor level.

The range of motion exercise may comprise the user interacting with the sensory input device using any of fingers and thumb, a stylus.

The range of motion exercise may comprise a finger thumb opposition exercise. The finger thumb opposition exercise may comprise pinching together two objects having a specified separation and angle. The specified separation and angle of the objects may be varied. The specified separation may vary between a maximum and minimum separation as a function of the angle. The finger thumb opposition exercise may measure the range of motion of the finger and thumb as a function of the position, or angle, of the hand. The finger thumb opposition exercise aims to improve a range of motion of the finger and thumb of the user.

The finger thumb opposition exercise may comprise pinching a plurality of objects and dragging the objects to a plurality of targets. For example, pinching a plurality of objects and dragging the objects to a plurality of targets may comprise pinching a plurality of pegs and dragging the pegs to a plurality of holes.

The range of motion exercise may comprise a first test for a first hand of the user and a second test for a second hand of the user.

Additionally or alternatively selecting the exercise having a difficulty level which matches the baseline user fine motor level may comprise selecting a dexterity exercise having a difficulty level which matches the baseline user fine motor level.

The dexterity exercise may comprise rotating an object around one or more moving objects with a finger and thumb or with a stylus. The speed of the one or more moving objects, the size of the one or more moving objects and the number of the one or more moving objects may be varied.

The dexterity exercise may comprise a dexterity and motor planning test comprising creating a pathway through a maze-type object from an entry to an exit. Length of the pathway and locations of the entry and exit of the maze-type object may be varied.

The dexterity exercise may comprise drawing progressively larger circles around an object or a shape such as letters of the alphabet.

The dexterity exercise may comprise a first test for a first hand of the user and a second test for a second hand of the user.

Additionally or alternatively selecting the exercise having a difficulty level which matches the baseline user fine motor level may comprise selecting a handwriting exercise having a difficulty level which matches the baseline user fine motor level. The handwriting exercise may require the user to perform a handwriting task. The handwriting exercise may measure user control of a pen/stylus during the exercise.

Directing the user to perform the exercise may comprise causing the sensory input device to display the exercise to the user. Causing the sensory input device to display the exercise to the user may comprise displaying one or more objects required for the exercise to the user. Causing the sensory input device to display the exercise to the user may comprise displaying a game incorporating the one or more objects required for the exercise to the user.

Directing the user to perform the exercise may comprise causing the sensory output device to play a plurality of instructions to direct the user to perform the exercise. The plurality of instructions may comprise any of audio instructions, vibration instructions, visual instructions.

The plurality of instructions may comprise a start instruction to direct the user to start the exercise. The plurality of instructions may comprise an end instruction to direct the user to end the exercise. The plurality of instructions may comprise motivational instructions to the user. The plurality of instructions may comprise one or more prompts to user. The one or more prompts may comprise any of telling the user to use a best hand or an other hand, warning the user not to move the mobile computing device to perform the exercise. This discourages the user from rotating the device to make the fine motor exercise easier.

Receiving the user fine motor data measured during user performance of the exercise may comprise receiving user fine motor data comprising data for points of contact made by the user on the sensory input device during performance of the exercise. The data for the points of contact may be obtained in a specified period of time in the range of from approximately 1 second to approximately 60 seconds, for example approximately 10 seconds.

Using the user fine motor data to establish the further user fine motor level may comprise using the data for the points of contact made by the user on the sensory input device to compute one or more fine motor metrics of the further user fine motor level.

The one or more fine motor metrics may comprise any of positions of the points of contact, times of the points of contacts, dimensions of the points of contact, changes in the points of contact.

The one or more fine motor metrics may comprise any of range of movement of the user, time taken for a movement by the user, speed of movement of the user, surface area size covered by the user, user dexterity.

The one or more fine motor metrics may comprise any of time taken for completion of a task of the exercise, number of tasks of the exercise completed, number of tasks of the exercise successfully completed, time between completion of a task and commencing a next task. When the exercise comprises a range of motion exercise comprising a finger thumb opposition exercise, the one or more fine motor metrics may comprise any of average offset between finger/thumb and target on initial contact, range of motion of finger and thumb, range of motion of finger and thumb as a function of hand position, closing of finger and thumb, straightness of path followed on closing finger and thumb, rotation of path followed on closing finger and thumb.

When the exercise comprises a dexterity exercise comprising creating a pathway through a maze-type object, the one or more fine motor metrics may comprise any of time for completion of the exercise, errors in completion of the exercise, number of pathways taken during the exercise.

When the exercise comprises a handwriting exercise, the one or more fine motor metrics may comprise control of a pen/stylus by the user during the exercise.

Comparing the further user fine motor level with the baseline user fine motor level may comprise comparing one or more fine motor metrics of the further user fine motor level with one or more baseline fine motor metrics of the baseline user fine motor level.

When the further user fine motor level is equal to or greater than the baseline user fine motor level, setting the baseline user fine motor level to a higher user fine motor level may comprise setting one or more baseline fine motor metrics of the baseline user fine motor level to one or more higher fine motor metrics. Setting the one or more baseline fine motor metrics to one or more higher fine motor metrics may comprise applying a multiplication factor to the one or more baseline fine motor metrics. The multiplication factor may comprise any of a 5% increase of the one or more baseline fine motor metrics, a 10% increase of the one or more baseline fine motor metrics.

For example, when the exercise comprises a range of motion exercise comprising a finger thumb opposition exercise, setting the one or more baseline fine motor metrics to one or more higher fine motor metrics may comprise increasing separation of objects of the exercise.

Setting the one or more baseline fine motor metrics to one or more higher fine motor metrics increases the difficulty level of the next fine motor exercise. The difficulty level of the next exercise is increased in response to the user succeeding in the current exercise, e.g. managing to complete the current exercise without any failures. Thus the therapy provided to the user by the system is tailored to the user and adaptive to the user's performance. Increasing the difficulty of the exercise, in response to the user continuing to succeed, is incremental and cumulative, but will ultimately be limited by the sensory input device.

When the further user fine motor level is less than the baseline user fine motor level, setting the baseline user fine motor level to a lower user fine motor level may comprise setting one or more baseline fine motor metrics of the baseline user fine motor level to one or more lower fine motor metrics. Setting the one or more baseline fine motor metrics to one or more lower fine motor metrics may comprise applying a multiplication factor to the one or more baseline fine motor metrics. The multiplication factor may comprise any of a 5% decrease of the one or more baseline fine motor metrics, a 10% decrease of the one or more baseline fine motor metrics.

For example, when the exercise comprises a range of motion exercise comprising a finger thumb opposition exercise, setting the one or more baseline fine motor metrics to one or more lower fine motor metrics may comprise decreasing separation of objects of the exercise.

Setting the one or more baseline fine motor metrics to one or more lower fine motor metrics decreases the difficulty level of the next fine motor exercise. The difficulty level of the next exercise is decreased in response to the user not succeeding in the current exercise, e.g. not managing to complete the current exercise without any failures. Thus, again, the therapy provided to the user by the system is tailored to the user and adaptive to the user's performance. Decreasing the difficulty of the exercise, in response to the user continuing not to succeed, is incremental and cumulative, but will ultimately be limited by the sensory input device.

In the same day a user could, for example, be challenged, cumulatively and incrementally, up to 30% higher than their baseline fine motor level, based on performance. Likewise, a cumulative, incremental reduction in difficulty by 60% could occur on a bad day.

Receiving the baseline user fine motor level may comprise receiving a previous user fine motor level. The previous user fine motor level may comprise a baseline user fine motor level of a previous therapy. When the system provides a first therapy of a day, the previous user fine motor level may comprise a baseline user fine motor level of a previous therapy on a preceding day. When the system provides a second or subsequent therapy of a day, the previous user fine motor level may comprise a baseline user fine motor level of a preceding therapy.

Receiving the baseline user fine motor level may comprise reading the baseline user fine motor level of a previous therapy from a memory device of the mobile computing device. Receiving the baseline user fine motor level may comprise reading the baseline user fine motor level of a previous therapy from an input device of the mobile computing device.

The previous user fine motor level may be set to a value indicating an expected fine motor level of a user with limited mobility. The previous user fine motor level may be constrained using clinician-set disease specific parameters. These parameters could be adapted over time based on response of the user to the therapy.

Receiving the baseline user fine motor level may comprise:

(a) selecting an initial exercise having an initial difficulty level, (b) directing the user to perform the initial exercise, (c) receiving user fine motor data measured during user performance of the initial exercise from the sensory input device, and (d) using the user fine motor data to establish the baseline user fine motor level.

Selecting the initial exercise having the initial difficulty level may comprise selecting a range of motion exercise having the initial difficulty level.

The range of motion exercise may comprise the user interacting with the sensory input device using any of fingers and thumb, a stylus.

The range of motion exercise may comprise a finger thumb opposition exercise. The finger thumb opposition exercise may comprise pinching together two objects having a specified separation and angle. The specified separation and angle of the objects may be varied. The specified separation may vary between a maximum and minimum separation as a function of the angle. The finger thumb opposition exercise may measure the range of motion of the finger and thumb as a function of the position, or angle, of the hand. The finger thumb opposition exercise aims to improve a range of motion of the finger and thumb of the user.

The finger thumb opposition exercise may comprise pinching a plurality of objects and dragging the objects to a plurality of targets. For example, pinching a plurality of objects and dragging the objects to a plurality of targets may comprise pinching a plurality of pegs and dragging the pegs to a plurality of holes.

The range of motion exercise may comprise a first test for a first hand of the user and a second test for a second hand of the user.

Additionally or alternatively selecting the exercise having a difficulty level which matches the baseline user fine motor level may comprise selecting a dexterity exercise having a difficulty level which matches the baseline user fine motor level.

The dexterity exercise may comprise rotating an object around one or more moving objects with a finger and thumb or with a stylus. The speed of the one or more moving objects, the size of the one or more moving objects and the number of the one or more moving objects may be varied.

The dexterity exercise may comprise a dexterity and motor planning test comprising creating a pathway through a maze-type object from an entry to an exit. Length of the pathway and locations of the entry and exit of the maze-type object may be varied.

The dexterity exercise may comprise drawing progressively larger circles around an object or a shape such as letters of the alphabet.

The dexterity exercise may comprise a first test for a first hand of the user and a second test for a second hand of the user.

The dexterity exercise may comprise a first test for a first hand of the user and a second test for a second hand of the user.

Additionally or alternatively selecting the initial exercise having the initial difficulty level may comprise selecting a handwriting exercise having the initial difficulty level. The handwriting exercise may require the user to perform a handwriting task. The handwriting exercise may measure user control of a pen/stylus during the exercise.

Directing the user to perform the initial exercise may comprise causing the sensory input device to display the initial exercise to the user. Causing the sensory input device to display the initial exercise to the user may comprise displaying one or more objects required for the initial exercise to the user. Causing the sensory input device to display the initial exercise to the user may comprise displaying a game incorporating the one or more objects required for the initial exercise to the user.

Directing the user to perform the initial exercise may comprise causing the sensory output device to play a plurality of instructions to direct the user to perform the initial exercise. The plurality of instructions may comprise any of audio instructions, vibration instructions, visual instructions.

The plurality of instructions may comprise a start instruction to direct the user to start the initial exercise. The plurality of instructions may comprise an end instruction to direct the user to end the initial exercise. The plurality of instructions may comprise motivational instructions to the user. The plurality of instructions may comprise one or more prompts to user. The one or more prompts may comprise any of telling the user to use a best hand or an other hand, warning the user not to move the mobile computing device to perform the initial exercise. This discourages the user from rotating the device to make the fine motor exercise easier.

Receiving the user fine motor data measured during user performance of the initial exercise may comprise receiving user fine motor data comprising data for points of contact made by the user on the sensory input device during performance of the initial exercise. The data for the points of contact may be obtained in a specified period of time in the range of from approximately 1 second to approximately 60 seconds, for example approximately 10 seconds.

Using the user fine motor data to establish the baseline user fine motor level may comprise using the data for the points of contact made by the user on the sensory input device to compute one or more fine motor metrics of the baseline user fine motor level.

The one or more fine motor metrics may comprise any of positions of the points of contact, times of the points of contacts, dimensions of the points of contact, changes in the points of contact.

The one or more fine motor metrics may comprise any of range of movement of the user, time taken for a movement by the user, speed of movement of the user, surface area size covered by the user, user dexterity.

The one or more fine motor metrics may comprise any of time taken for completion of a task of the initial exercise, number of tasks of the initial exercise completed, number of tasks of the initial exercise successfully completed, time between completion of a task and commencing a next task.

When the exercise comprises a range of motion exercise comprising a finger thumb opposition exercise, the one or more fine motor metrics may comprise any of average offset between finger/thumb and target on initial contact, range of motion of finger and thumb, range of motion of finger and thumb as a function of hand position, closing of finger and thumb, straightness of path followed on closing finger and thumb, rotation of path followed on closing finger and thumb.

When the exercise comprises a dexterity exercise comprising creating a pathway through a maze-type object, the one or more fine motor metrics may comprise any of time for completion of the exercise, errors in completion of the exercise, number of pathways taken during the exercise.

When the exercise comprises a handwriting exercise, the one or more fine motor metrics may comprise control of a pen/stylus by the user during the exercise.

Adjusting the sensitivity of the sensory input device according to the baseline user fine motor level may comprise setting a sensitivity level for the device such that it detects when the user moves their thumb and forefinger or a stylus on the device baseline user fine motor level.

The processor of the therapy system may be further configured to select an additional exercise having a difficulty level which does not match the baseline user fine motor level. The user fine motor level measured during the additional exercise may be used to check the sensitivity of the sensory input device. The user fine motor level measured during the additional exercise may be used to adjust the sensitivity of the sensory input device. This provides sense checks of the sensitivity of the sensory input device in case of spontaneous user improvements or changes in sensitivity requirements.

The processor may be further configured to select an additional exercise having a difficulty level which does not match the baseline user fine motor level. The additional exercise is provided to allow for variation in the exercises of the therapy not according to the user fine motor level.

The sensory input device may comprise a touch input device. The touch input device may comprise a touch screen operable to detect movement thereon of a stylus held by the user or user thumb and forefinger movement. The touch screen may be integrated with the mobile computing device.

According to a second aspect of the invention there is provided a system for providing a therapy to a user comprising:

a mobile computing device, connected to or held by the user, comprising a sensory output device configured to direct the user in the performance of exercises, a sensory input device connected to the mobile computing device and at least one processor configured to:

(a) receive a therapy start signal, (b) receive a baseline user fine motor level, (c) adjust the sensitivity of the sensory input device according to the baseline user fine motor level, (d) select an exercise having a difficulty level which matches the baseline user fine motor level, (e) direct the user to perform the exercise, (f) receive user fine motor data measured during user performance of the exercise from the sensory input device, (g) use the user fine motor data to establish a further user fine motor level, (h) compare the further user fine motor level with the baseline user fine motor level, (i) when the further user fine motor level is equal to or greater than the baseline user fine motor level, set the baseline user fine motor level to a higher user fine motor level and go to (k), (j) when the further user fine motor level is less than the baseline user fine motor level, set the baseline user fine motor level to a lower user fine motor level and go to (k), (k) when a therapy stop signal is not received, return to (d), (l) when a therapy stop signal is received, record the baseline user fine motor level and cause the sensory output device to direct the user to stop the therapy.

The at least one processor of the mobile computing device of the system for providing a therapy to a user may be further configured to:

(a) receive a therapy start signal,
(b) receive a baseline user speech level,
(c) adjust the sensitivity of the sensory input device according to the baseline user speech level,
(d) select a speech exercise having a difficulty level which matches the baseline user speech level,
(e) direct the user to perform the speech exercise,
(f) receive user speech data measured during user performance of the speech exercise from the sensory input device,
(g) use the user speech data to establish a further user speech level,
(h) compare the further user speech level with the baseline user speech level,
(i) when the further user speech level is equal to or greater than the baseline user speech level, set the baseline user speech level to a higher user speech level and go to (k),
(j) when the further user speech level is less than the baseline user speech level, set the baseline user speech level to a lower user speech level and go to (k),
(k) when a therapy stop signal is not received, return to (d),
(l) when a therapy stop signal is received, record the baseline user speech level and cause the sensory output device to direct the user to stop the therapy,
(m) playing an initial sound on a speaker of the sensory output device of the mobile computing device to determine the baseline performance of the speaker and to determine any speaker defects,
(n) further calibrating the speaker to the users own voice to provide a starting volume for the speech exercise.

An initial sound is thus played on the device speaker before an exercise to determine the baseline performance of the speaker and also if there are any defects.

The system will calibrate the level accordingly so that tailored therapy may be delivered in a standardised way and be comparable across devices whether it be iOS or Android or other. The system then calibrates to the user's voice as a starting point for their first exercise.

Selecting the speech exercise having a difficulty level which matches the baseline user speech level may comprise selecting a vocal exercise having a difficulty level which matches the baseline user speech level.

The vocal exercise may comprise a text test comprising one or more words or sentences for the user to say.

The vocal exercise may comprise a sound test comprising one or more sounds for the user to say. The one or more sounds may comprise any of 'oooo', 'aaaaa', 'puh', 'tuh', 'kuh'.

The vocal exercise may comprise a prosody test comprising assessing non-sound related speech features of the user. The non-sound related speech features may comprise any of pitch, volume, inflection, syllable/word stress, speech rate, tone of the speech of the user.

The vocal exercise may comprise a clarity test comprising assessing intelligibility of speech of the user.

Additionally or alternatively, selecting the speech exercise having a difficulty level which matches the baseline user speech level may comprise selecting a facial exercise having a difficulty level which matches the baseline user speech level.

The facial exercise may comprise a facial expression for the user to perform. Performing the facial expression may comprise matching and holding the facial expression for a specified time. The specified time may be 3 seconds.

The facial expression may comprise any of puckered lips, smiling, eyebrows up or down, tongue out, tongue out to the right, tongue out to the left, tongue out and up, tongue out and down, open mouth, frowning, scowling, puffed cheeks.

The facial exercise works the muscles of the face of the user to improve and develop strength, range of motion and control of facial features by the user, all of which have an impact on the speech of the user.

Directing the user to perform the speech exercise may comprise causing the sensory output device to play a speech exercise file for the speech exercise to the user.

Causing the sensory output device to play the speech exercise file to the user may comprise playing a plurality of instructions to direct the user to perform the speech exercise. The plurality of instructions may comprise motivational instructions for the user. These instructions are intended to encourage long-term use of the therapy system by the user. The plurality of instructions may comprise one or more prompts to user. The one or more prompts may comprise any of a warning to the user when background noise is too loud, a warning to the user when distance from the sensory output device is too great. The plurality of instructions may comprise a start instruction to direct the user to start the speech exercise. The plurality of instructions may comprise an end instruction to direct the user to end the speech exercise. The plurality of instructions may comprise any of audio instructions, visual instructions.

The speech exercise file may be selected from a plurality of speech exercise files. The plurality of speech exercise files may be stored in a memory device of the mobile computing device. The plurality of speech exercise files may be stored in a remote computing device and downloaded to the mobile computing device.

The speech exercise file may comprise a vocal exercise file. The vocal exercise file may comprise a plurality of instructions to direct the user to perform a text test comprising one or more words or sentences for the user say. The plurality of instructions may comprise audio instructions to perform the text test. The audio instructions may comprise one or more real-time cues. Additionally or alternatively, the plurality of instructions may comprise visual instructions to perform the text test. The visual instructions may comprise one or more diagrams of words or sentences.

The vocal exercise file may comprise a plurality of instructions to direct the user to perform a sound test comprising one or more sounds for the user to say. The plurality of instructions may comprise audio instructions to perform the sound test. The audio instructions may comprise one or more real-time cues. Additionally or alternatively, the plurality of instructions may comprise visual instructions to perform the sound test. The visual instructions may comprise any of one or more diagrams of sounds, one or more diagrams of a facial expression making the sound, a target facial image performing a facial expression making the sound.

The vocal exercise file may comprise a plurality of instructions to direct the user to perform a prosody test comprising assessing non-sound related speech features of the user. The plurality of instructions may comprise audio instructions to perform the prosody test. The audio instructions may comprise one or more real-time cues. Additionally or alternatively, the plurality of instructions may comprise visual instructions to perform the prosody test. The visual instructions may comprise any of a visual representation of a volume dial for assessing volume of the speech of the user, an item which travels above and below set objects in response to changes in volume of the speech of the user, an item which travels above and below set objects in response to changes in tone of the speech of the user, an item which travels above and below set objects in response to changes in pattern of syllable/word stress of the speech of the user.

The vocal exercise file may comprise a plurality of instructions to direct the user to perform a clarity test comprising assessing intelligibility of speech of the user. The plurality of instructions may comprise audio instructions to perform the clarity test. The audio instructions may comprise one or more real-time cues. Additionally or alternatively, the plurality of instructions may comprise visual instructions to perform the clarity test. The visual instructions may comprise one or more diagrams of texts or sounds for the user to perform in the clarity test.

The speech exercise file may comprise a facial exercise file. The facial exercise file may comprise a plurality of instructions to direct the user to perform a facial expression. The plurality of instructions may comprise audio instructions to perform the facial expression. The audio instructions may comprise one or more real-time cues. Additionally or alternatively, the plurality of instructions may comprise visual instructions to perform the facial expression. The visual instructions may comprise one or more diagrams of the facial expression. The visual instructions may comprise a target facial image performing the facial expression. The target facial image may be displayed over the face of the user. The user may then see the target facial image performing the facial expression and their face performing the facial expression, thus providing visual feedback to the user.

Receiving the user speech data measured during user performance of the speech exercise may comprise receiving user speech data comprising user audio speech data. Additionally or alternatively, receiving the user speech data measured during user performance of the speech exercise may comprise receiving user speech data comprising user visual speech data. The user speech data may be received in a predetermined period of time. The predetermined period of time may be in the range of approximately 5 seconds to approximately 30 seconds, preferably approximately 10 seconds.

When the speech exercise comprises a vocal exercise receiving the user speech data measured during user performance of the vocal exercise may comprise receiving user audio speech data representing any of text, sound, prosody, clarity of the speech of the user.

When the speech exercise comprises a facial exercise receiving the user speech data measured during user performance of the facial exercise may comprise receiving user visual speech data comprising an image of the user performing the facial exercise. The user visual speech data may comprise an image of the user performing a facial expression of the facial exercise. The image of the user may comprise markers placed at key locations of the user face. The key locations may comprise any of edge points and mid points of the upper and lower lip, outline points of the face, corners points and mid points of the eyebrows, corners points and mid points of the eyes. The user visual speech data may comprise an image of the user performing a facial expression of the facial exercise and a target facial image performing the facial expression.

Using the user speech data to establish the further user speech level may comprise using the data to compute one or more speech metrics of the further user speech level.

When the speech exercise comprises a vocal exercise using the user speech data to establish the further user speech level may comprise using the user audio speech data to compute one or more audio speech metrics of the further user speech level. The one or more audio speech metrics may comprise any of a speaking metric, a prosody metric, a clarity metric. The speaking metric may comprise any of a text speaking metric, a sound speaking metric. The prosody metric may comprise any of a volume prosody metric, a pattern of stress prosody metric, an intonation prosody metric, a speech rate prosody metric. The speech rate prosody metric may be based on a number of sounds made by the user in a specific period of time, such as in the range of approximately 5 seconds to approximately seconds, e.g. approximately 10 seconds.

When the speech exercise comprises a facial exercise using the user speech data to establish the further user speech level may comprise using the user visual speech data to compute one or more visual speech metrics of the further user speech level. The one or more visual speech metrics may comprise one or more facial expression performance metrics.

The one or more facial expression performance metrics may be calculated using an image of the user performing a facial expression of the facial exercise. The one or more facial expression performance metrics may be calculated using markers placed on the image of the user performing the facial expression. The one or more facial expression performance metrics may be calculated using distance between markers placed on the image of the user performing the facial expression. A facial expression performance metric of a facial expression comprising an open mouth may be calculated using a distance between a marker placed at a mid point of the top lip and a marker placed at a mid point of the bottom lip. A facial expression performance metric of a facial expression comprising a smile may be calculated using a distance between a marker placed at a first edge point of the lips and a marker placed at a second edge point of the lips, a distance between a marker placed at the first edge point of the lips and a marker placed at an edge point of a corresponding eye and a distance between a marker placed at the second edge point of the lips and a marker placed at an edge point of a corresponding eye.

The one or more facial expression performance metrics may be calculated using an image of the user performing a facial expression of the facial exercise and a target facial image performing the facial expression.

Comparing the further user speech level with the baseline user speech level may comprise comparing one or more speech metrics of the further user speech level with one or more baseline speech metrics of the baseline user speech level.

When the further user speech level is equal to or greater than the baseline user speech level, setting the baseline user speech level to a higher user speech level may comprise setting one or more baseline speech metrics of the baseline user speech level to one or more higher speech metrics. Setting the one or more baseline speech metrics to one or more higher speech metrics may comprise applying a multiplication factor to the one or more baseline speech metrics. The multiplication factor may comprise any of a 5% increase of the one or more baseline speech metrics, a 10% increase of the one or more baseline speech metrics.

Setting the one or more baseline speech metrics to one or more higher speech metrics increases the difficulty level of the next speech exercise. The difficulty level of the next exercise is increased in response to the user succeeding in the current exercise, e.g. managing to complete the current exercise without any failures. Increasing the difficulty of the exercise, in response to the user continuing to succeed is incremental and cumulative. Thus the therapy provided to the user by the system is tailored to the user and adaptive to the user's performance.

When the further speech motor level is less than the baseline user speech level, setting the baseline user speech level to a lower user speech level may comprise setting one or more baseline speech metrics of the baseline user speech level to one or more lower speech metrics.

Setting the one or more baseline speech metrics to one or more lower speech metrics may comprise applying a multiplication factor to the one or more baseline speech metrics. The multiplication factor may comprise any of a 5% decrease of the one or more baseline speech metrics, a 10% decrease of the one or more baseline speech metrics.

Setting the one or more baseline speech metrics to one or more lower speech metrics decreases the difficulty level of the next speech exercise. The difficulty level of the next exercise is decreased in response to the user not succeeding in the current exercise, e.g. not managing to complete the current exercise without any failures. Decreasing the difficulty of the exercise, in response to the user continuing not to succeed is incremental and cumulative. Thus, again, the therapy provided to the user by the system is tailored to the user and adaptive to the user's performance.

In the same day a user could be challenged, cumulatively and incrementally, up to, for example, 30% higher than their baseline speech level, based on performance. Likewise, a cumulative, incremental reduction in difficulty by, for example, 60% could occur on a bad day.

Receiving the baseline user speech level may comprise receiving a previous user speech level. The previous user speech level may comprise a baseline user speech level of a previous therapy. When the system provides a first therapy of a day, the previous user speech level may comprise a baseline user speech level of a previous therapy on a preceding day. When the system provides a second or subsequent therapy of a day, the previous user speech level may comprise a baseline user speech level of a preceding therapy.

Receiving the baseline user speech level may comprise reading the baseline user speech level of a previous therapy from a memory device of the mobile computing device. Receiving the baseline user speech level may comprise reading the baseline user speech level of a previous therapy from an input device of the mobile computing device.

The previous user speech level may be set to a value indicating an expected speech level of a user with limited speech ability. The previous user speech level may be constrained using clinician-set disease specific parameters. These parameters could be adapted over time based on response of the user to the therapy.

Receiving the baseline user speech level may comprise:

(a) selecting an initial speech exercise having an initial difficulty level, (b) directing the user to perform the initial speech exercise, (c) receiving user speech data measured during user performance of the initial speech exercise from the sensory input device, and (d) using the user speech data to establish the baseline user speech level.

Selecting the initial speech exercise having an initial difficulty level may comprise selecting a vocal exercise having an initial difficulty level.

The vocal exercise may comprise a text test comprising one or more words or sentences for the user to say. The vocal exercise may comprise a sound test comprising one or more sounds for the user to say. The one or more sounds may comprise any of 'oooo', 'aaaaa', 'puh', 'tuh', 'kuh'.

The vocal exercise may comprise a prosody test comprising assessing non-sound related speech features of the user. The non-sound related speech features may comprise any of pitch, volume, inflection, syllable/word stress, speech rate, tone of the speech of the user.

The vocal exercise may comprise a clarity test comprising assessing intelligibility of speech of the user.

Additionally or alternatively, selecting the speech exercise having a difficulty level which matches the baseline user speech level may comprise selecting a facial exercise having a difficulty level which matches the baseline user speech level.

The facial exercise may comprise a facial expression for the user to perform. Performing the facial expression may comprise matching and holding the facial expression for a specified time. The specified time may be 3 seconds. The facial expression may comprise any of puckered lips, smiling, eyebrows up or down, tongue out, tongue out to the right, tongue out to the left, tongue out and up, tongue out and down, open mouth, frowning, scowling, puffed cheeks. The facial exercise works the muscles of the face of the user to improve and develop strength, range of motion and control of facial features by the user, all of which have an impact on the speech of the user.

Directing the user to perform the initial speech exercise may comprise causing the sensory output device to play a speech exercise file for the initial speech exercise to the user.

Causing the sensory output device to play the speech exercise file to the user may comprise playing a plurality of instructions to direct the user to perform the initial speech exercise. The plurality of instructions may comprise motivational instructions for the user. These instructions are intended to encourage long-term use of the therapy system by the user. The plurality of instructions may comprise one or more prompts to user. The one or more prompts may comprise any of a warning to the user when background noise is too loud, a warning to the user when distance from the sensory output device is too great. The plurality of instructions may comprise a start instruction to direct the user to start the initial speech exercise. The plurality of instructions may comprise an end instruction to direct the user to end the initial speech exercise. The plurality of instructions may comprise any of audio instructions, visual instructions.

The initial speech exercise file may be selected from a plurality of speech exercise files. The plurality of speech exercise files may be stored in a memory device of the mobile computing device. The plurality of speech exercise files may be stored in a remote computing device and downloaded to the mobile computing device.

The initial speech exercise file may comprise a vocal exercise file. The vocal exercise file may comprise a plurality of instructions to direct the user to perform a text test comprising one or more words or sentences for the user say. The plurality of instructions may comprise audio instructions to perform the text test. The audio instructions may comprise one or more real-time cues. Additionally or alternatively, the plurality of instructions may comprise visual instructions to perform the text test. The visual instructions may comprise one or more diagrams of words or sentences.

The vocal exercise file may comprise a plurality of instructions to direct the user to perform a sound test comprising one or more sounds for the user to say. The plurality of instructions may comprise audio instructions to perform the sound test. The audio instructions may comprise one or more real-time cues. Additionally or alternatively, the plurality of instructions may comprise visual instructions to perform the sound test. The visual instructions may comprise any of one or more diagrams of sounds, one or more diagrams of a facial expression making the sound, a target facial image performing a facial expression making the sound.

The vocal exercise file may comprise a plurality of instructions to direct the user to perform a prosody test comprising assessing non-sound related speech features of the user. The plurality of instructions may comprise audio instructions to perform the prosody test. The audio instructions may comprise one or more real-time cues. Additionally or alternatively, the plurality of instructions may comprise visual instructions to perform the prosody test. The visual instructions may comprise any of a visual representation of a volume dial for assessing volume of the speech of the user, an item which travels above and below set objects in response to changes in volume of the speech of the user, an item which travels above and below set objects in response to changes in tone of the speech of the user, an item which travels above and below set objects in response to changes in pattern of syllable/word stress of the speech of the user.

The vocal exercise file may comprise a plurality of instructions to direct the user to perform a clarity test comprising assessing intelligibility of speech of the user. The plurality of instructions may comprise audio instructions to perform the clarity test. The audio instructions may comprise one or more real-time cues. Additionally or alternatively, the plurality of instructions may comprise visual instructions to perform the clarity test. The visual instructions may comprise one or more diagrams of texts or sounds for the user to perform in the clarity test.

The speech exercise file may comprise a facial exercise file. The facial exercise file may comprise a plurality of instructions to direct the user to perform a facial expression. The plurality of instructions may comprise audio instructions to perform the facial expression. The audio instructions may comprise one or more real-time cues. Additionally or alternatively, the plurality of instructions may comprise visual instructions to perform the facial expression. The visual instructions may comprise one or more diagrams of the facial expression. The visual instructions may comprise a target facial image performing the facial expression. The target facial image may be displayed over the face of the user. The user may then see the target facial image performing the facial expression and their face performing the facial expression, thus providing visual feedback to the user.

Receiving the user speech data measured during user performance of the initial speech exercise may comprise receiving user speech data comprising user audio speech data. Additionally or alternatively, receiving the user speech data measured during user performance of the initial speech exercise may comprise receiving user speech data comprising user visual speech data. The user speech data may be received in a predetermined period of time. The predetermined period of time may be in the range of approximately 5 seconds to approximately 30 seconds, preferably approximately 10 seconds.

When the speech exercise comprises a vocal exercise receiving the user speech data measured during user performance of the vocal exercise may comprise receiving user audio speech data representing any of text, sound, prosody, clarity of the speech of the user.

When the speech exercise comprises a facial exercise receiving the user speech data measured during user performance of the facial exercise may comprise receiving user visual speech data comprising an image of the user performing the facial exercise. The user visual speech data may comprise an image of the user performing a facial expression of the facial exercise. The image of the user may comprise markers placed at key locations of the user face. The key locations may comprise any of edge points and mid points of the upper and lower lip, outline points of the face, corners points and mid points of the eyebrows, corners points and mid points of the eyes. The user visual speech data may comprise an image of the user performing a facial expression of the facial exercise and a target facial image performing the facial expression.

Using the user speech data to establish the baseline user speech level may comprise using the data to compute one or more speech metrics of the baseline user speech level.

When the speech exercise comprises a vocal exercise using the user speech data to establish the baseline user speech level may comprise using the user audio speech data to compute one or more audio speech metrics of the baseline user speech level. The one or more audio speech metrics may comprise any of a speaking metric, a prosody metric, a clarity metric. The speaking metric may comprise any of a text speaking metric, a sound speaking metric. The prosody metric may comprise any of a volume prosody metric, a pattern of stress prosody metric, an intonation prosody metric, a speech rate prosody metric. The speech rate prosody metric may be based on a number of sounds made by the user in a specific period of time, such as in the range of approximately 5 seconds to approximately seconds, e.g. approximately 10 seconds.

When the speech exercise comprises a facial exercise using the user speech data to establish the baseline user speech level may comprise using the user visual speech data to compute one or more visual speech metrics of the baseline user speech level. The one or more visual speech metrics may comprise one or more facial expression performance metrics.

The one or more facial expression performance metrics may be calculated using an image of the user performing a facial expression of the facial exercise. The one or more facial expression performance metrics may be calculated using markers placed on the image of the user performing the facial expression. The one or more facial expression performance metrics may be calculated using distance between markers placed on the image of the user performing the facial expression. A facial expression performance metric of a facial expression comprising an open mouth may be calculated using a distance between a marker placed at a mid point of the top lip and a marker placed at a mid point of the bottom lip. A facial expression performance metric of a facial expression comprising a smile may be calculated using a distance between a marker placed at a first edge point of the lips and a marker placed at a second edge point of the lips, a distance between a marker placed at the first edge point of the lips and a marker placed at an edge point of a corresponding eye and a distance between a marker placed at the second edge point of the lips and a marker placed at an edge point of a corresponding eye.

The one or more facial expression performance metrics may be calculated using an image of the user performing a facial expression of the facial exercise and a target facial image performing the facial expression.

Adjusting the sensitivity of the sensory input device according to the baseline user speech level may comprise setting a sensitivity level for an audio input device of the sensory input device.

Setting a sensitivity level for the audio input device may comprise setting the sensitivity level such that the audio input device is operable to detect when the user makes a sound at the baseline user speech level. Setting a sensitivity level for the audio input device may comprise setting a volume sensitivity level such that the audio input device is operable to detect when the user makes a sound at the baseline user speech level. This may allow adaptation for background noise. Setting a sensitivity level for the audio input device may comprise instructing the user to hold the audio input device approximately 30 cm from their face. Setting a sensitivity level for the audio input device may comprise instructing the user to move to a quieter area when background noise is present.

Adjusting the sensitivity of the sensory input device according to the baseline user speech level may comprise setting a sensitivity level for a visual input device of the sensory input device. Setting a sensitivity level for the visual input device may comprise setting a light sensitivity level such that the visual input device is operable to detect the face and facial features of the user at the baseline user speech level.

The ability to adapt the sensitivity level of the audio and visual input devices in this way ensures that the sensory input device may be adapted to the specific baseline user speech level requirements, so that, for example, volume and facial expression may be correctly sensed. This is important for users suffering from e.g. stroke, Parkinson's, late stage MS, cerebral palsy, for whom baseline speech levels may be impaired, for example sound volume levels may be low and facial expressions may have significant asymmetries.

The processor of the therapy system may be further configured to select an additional speech exercise having a difficulty level which does not match the baseline user speech level. The user speech level measured during the additional speech exercise may be used to check the sensitivity of the sensory input device. The user speech level measured during the additional speech exercise may be used to adjust the sensitivity of the sensory input device. The sensitivity of the sensory input device may be adjusted automatically according to the user speech level measured during the additional speech exercise. This provides sense checks of the sensitivity of the sensory input device in case of spontaneous user improvements or changes in sensitivity requirements.

The sensory input device may comprise an audio input device operable to detect audio speech data of the user. The audio input device may be integrated with the mobile computing device. The audio input device may comprise a microphone The sensory input device may comprise a visual input device operable to detect visual speech data of the user. The visual input device may be integrated with the mobile computing device. The visual input device may comprise a camera.

According to a third aspect of the invention there is provided a system for providing a therapy to a user comprising:

a mobile computing device, connected to or held by the user, comprising a sensory output device configured to direct the user in the performance of exercises, a sensory input device connected to the mobile computing device and at least one processor configured to:

(a) receive a therapy start signal, (b) receive a baseline user speech level, (c) adjust the sensitivity of the sensory input device according to the baseline user speech level, (d) select a speech exercise having a difficulty level which matches the baseline user speech level, (e) direct the user to perform the speech exercise, (f) receive user speech data measured during user performance of the speech exercise from the sensory input device, (g) use the user speech data to establish a further user speech level, (h) compare the further user speech level with the baseline user speech level, (i) when the further user speech level is equal to or greater than the baseline user speech level, set the baseline user speech level to a higher user speech level and go to (k), (j) when the further user speech level is less than the baseline user speech level, set the baseline user speech level to a lower user speech level and go to (k), (k) when a therapy stop signal is not received, return to (d), (l) when a therapy stop signal is received, record the baseline user speech level and cause the sensory output device to direct the user to stop the therapy.

The therapy start signal may comprise a signal input into the mobile computing device by the user. The therapy stop signal may comprise a signal generated by the processor on completion of the therapy. The therapy stop signal may comprise a signal input into the mobile computing device by the user. For example, the user may wish to stop before completion of the therapy.

According to a fourth aspect of the invention, there is provided a method of providing a therapy to a user comprising:

(a) receiving a therapy start signal, (b) receiving a baseline user motion level, (c) adjusting the sensitivity of one or more motion sensors according to the baseline user motion level, (d) selecting an exercise having a difficulty level which matches the baseline user motion level, (e) causing a sensory output device to direct the user to perform the exercise, (f) receiving user motion data measured during user performance of the exercise from the one or more motion sensors, (g) using the user motion data to establish a further user motion level, (h) comparing the further user motion level with the baseline user motion level, (i) when the further user motion level is equal to or greater than the baseline user motion level, setting the baseline user motion level to a higher user motion level and go to (k), (j) when the further user motion level is less than the baseline user motion level, setting the baseline user motion level to a lower user motion level and go to (k), (k) when a therapy stop signal is not received, returning to (d), (l) when a therapy stop signal is received, recording the baseline user motion level and causing the sensory output device to direct the user to stop the therapy, (n) determining whether each of the one or more sensors is an accelerometer sensor, a gyroscope sensor or a global positioning system sensor, (o) scanning the one or more sensors to determine which of the sensors are currently available to measure motion data of the user, and (p) using determinations from steps (m), (n) and (o) to further calibrate the sensitivity of the one or more motion sensors.

The method may further comprise:
(a) receiving a therapy start signal,
(b) receiving a baseline user fine motor level,
(c) adjusting the sensitivity of a sensory input device according to the baseline user fine motor level,
(d) selecting an exercise having a difficulty level which matches the baseline user fine motor level,
(e) directing the user to perform the exercise,
(f) receiving user fine motor data measured during user performance of the exercise from the sensory input device,
(g) using the user fine motor data to establish a further user fine motor level,
(h) comparing the further user fine motor level with the baseline user fine motor level,
(i) when the further user fine motor level is equal to or greater than the baseline user fine motor level, setting the baseline user fine motor level to a higher user fine motor level and go to (k),
(j) when the further user fine motor level is less than the baseline user fine motor level, setting the baseline user fine motor level to a lower user fine motor level and go to (k),
(k) when a therapy stop signal is not received, return to (d),
(l) when a therapy stop signal is received, recording the baseline user fine motor level and causing a sensory output device to direct the user to stop the therapy,
(m) pulsing the mobile computing device to determine a measure of vibration delivery latency of the sensory output device,
(n) determining screen size of the sensory output device and whether single and/or double touch of the screen is required as standard,
(o) using the determinations at (m) and (n) together with the determined operating system of the mobile computing device to further calibrate the sensitivity of the sensory input device.

The method may further comprise:
(a) receive a therapy start signal,
(b) receive a baseline user speech level,
(c) adjust the sensitivity of the sensory input device according to the baseline user speech level,
(d) select a speech exercise having a difficulty level which matches the baseline user speech level,
(e) direct the user to perform the speech exercise,
(f) receive user speech data measured during user performance of the speech exercise from the sensory input device,
(g) use the user speech data to establish a further user speech level,
(h) compare the further user speech level with the baseline user speech level,
(i) when the further user speech level is equal to or greater than the baseline user speech level, set the baseline user speech level to a higher user speech level and go to (k),
(j) when the further user speech level is less than the baseline user speech level, set the baseline user speech level to a lower user speech level and go to (k),
(k) when a therapy stop signal is not received, return to (d),
(l) when a therapy stop signal is received, record the baseline user speech level and cause the sensory output device to direct the user to stop the therapy,
(m) playing an initial sound on a speaker of the sensory output device of the mobile computing device to determine the baseline performance of the speaker and to determine any speaker defects, and
(n) further calibrating the speaker according to the determination at step (m) and to the users own voice to provide a starting volume for the speech exercise.

It will be appreciated that the details of the steps carried out by the processor of the therapy system detailed above apply to the method of providing therapy.

The user may be suffering from any of paediatric and adult neurological and central nervous system conditions including but not limited to low back pain, multiple sclerosis, stroke, seizures, Alzheimer's disease, Parkinson's disease, dementia, motor neuron disease, muscular atrophy, acquired brain injury, cancers involving neurological deficits, paediatric developmental conditions and rare genetic disorders such as spinal muscular atrophy.

BRIEF DESCRIPTION OF THE DRAWINGS

Embodiments of the invention will now be described, by way of example only, with reference to the accompanying drawings in which.

DETAILED DESCRIPTION OF THE INVENTION

Figure 1:
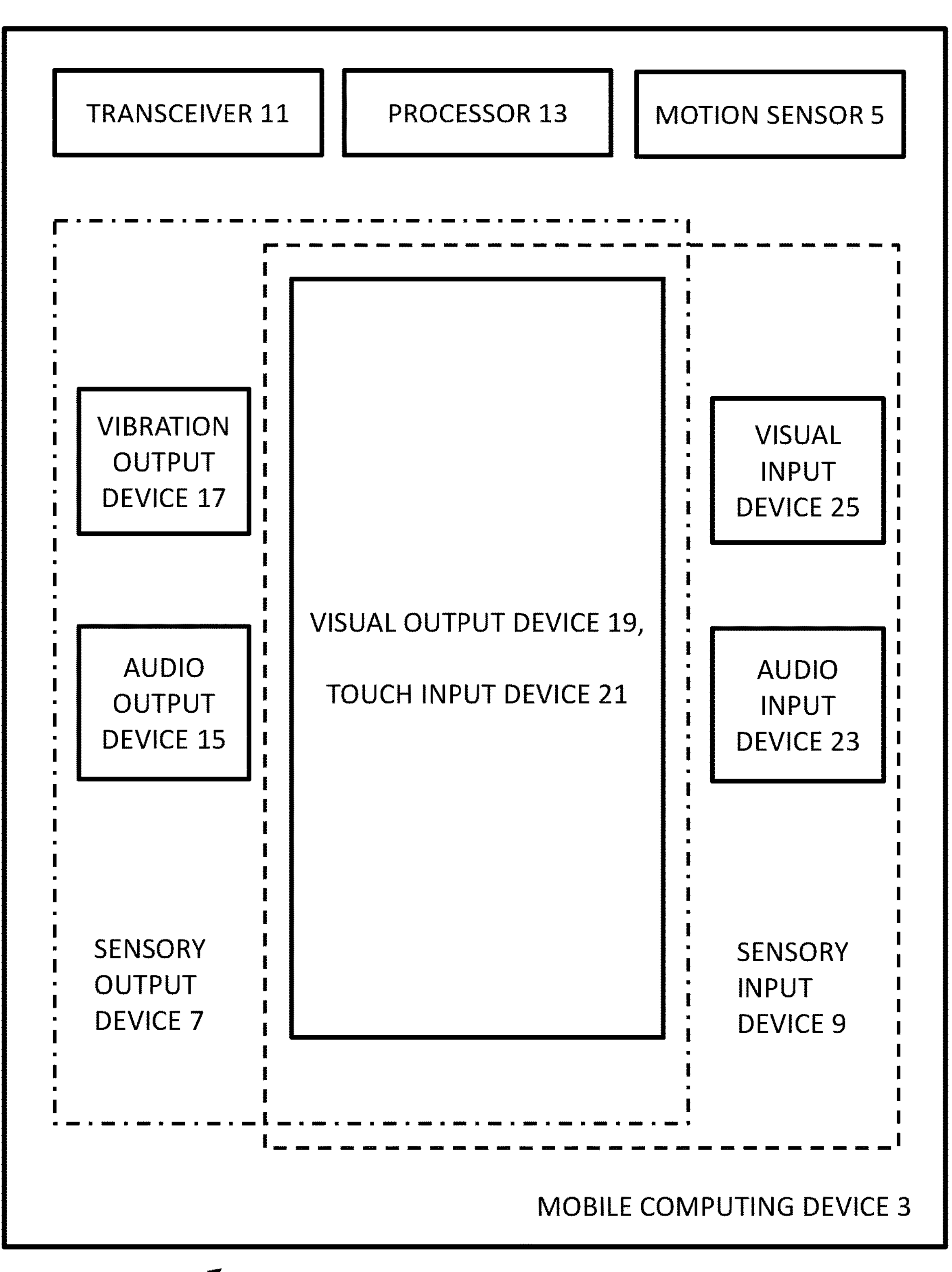
FIG. 1 is a schematic representation of a system for providing a therapy to a user according to the first aspect of the invention.

Referring to FIG. 1, a system 1 for providing a therapy to a user comprises a mobile computing device 3. The mobile computing device may comprise any of a mobile phone, a smart phone, a laptop, a watch, a smart watch, a pedometer.

The system 1 has been developed into an extendable template application to support a commonality between iOS and Android approaches to ensure platform harmonization differences between iOS modules and the Android version.

The present invention provides a Smart Platform which applies processes and algorithms to automatically assess and tailor treatment selection using smartphone or mobile device sensors. These processes allow the system 1 to assess and apply established therapies for altered speech, behaviour, gross or fine motor symptoms of neurological conditions.

The system 1 makes use of smartphone sensors to assess, monitor and tailor the therapies.

In particular, the system 1 uses the touch screen, accelerometer, gyroscope, magnetometer, camera and GPS systems to assess the users fine and gross motor, and speech skills.

The system 1 uses device and application agnostic algorithms to control how exercises are constructed, with customisable difficulty settings. Through the collection of the user's data the system may monitor their progress and provide information for clinicians.

Treatments are configured and tailored in a reproducible manner to match the user's needs and abilities, irrespective of the device upon which they are operating. The system 1 may be deployed for a specific disease and allows the device to tailor to that specific persons needs within a selected disease state.

The treatments are presented in a customisable user interface to provide a user experience which is appropriate for the user's condition and targeted to the user's needs and unique to each pharma client. Each product will look distinctly different but will carry the same core technology and systems.

The mobile computing device 3 comprises a motion sensor 5, a sensory output device 7, a sensory input device 9, a transceiver 11 and a processor 13.

The motion sensor 5 is configured to measure motion of the mobile computing device 3 and convert this into motion of the user. The motion sensor 5 comprises an accelerometer configured to measure 3-axis acceleration motion of the mobile computing device 3 and a gyroscope configured to measure rotation motion of the mobile computing device 3, at 100 Hz.

The sensory output device 7 comprises an audio output device 15, a vibration output device 17 and a visual output device 19. The audio output device 15 comprises a speaker of the mobile computing device 3, or a headphone system coupled to the mobile computing device 3, or a separate audio output device adapted for the user. The vibration output device 17 comprises a vibration device of the mobile computing device 3. The visual output device 19 comprises a screen of the mobile computing device 3.

The sensory input device 9 comprises a touch input device 21, an audio input device 23 and a visual input device 25. The touch input device 21 comprises the screen 17 of the sensory output device of the mobile computing device 3, acting as a touch screen. The audio input device 23 comprises a microphone of the mobile computing device 3 and the visual input device 25 comprises a camera of the mobile computing device 3.

The transceiver 11 of the mobile computing device 3 is configured to receive data from and transmit data to a remote computing device. The data may be received from and transmitted to the remote computer server via a cloud computing network. The remote computing device may be a computer server.

The mobile computing device 3 may further comprise any of a magnetometer, a pedometer, an altimeter, a location sensor, an iBeacon™ proximity sensor, an Eddystone™ proximity sensor.

In a first embodiment of the system 1, the system provides a gross motor therapy. In a first part of the gross motor therapy, the therapy exercises comprise gait exercises. This type of therapy assesses a user's gait patterns in order to provide tailored and adaptive therapy to improve their ability to walk.

Figure 2:
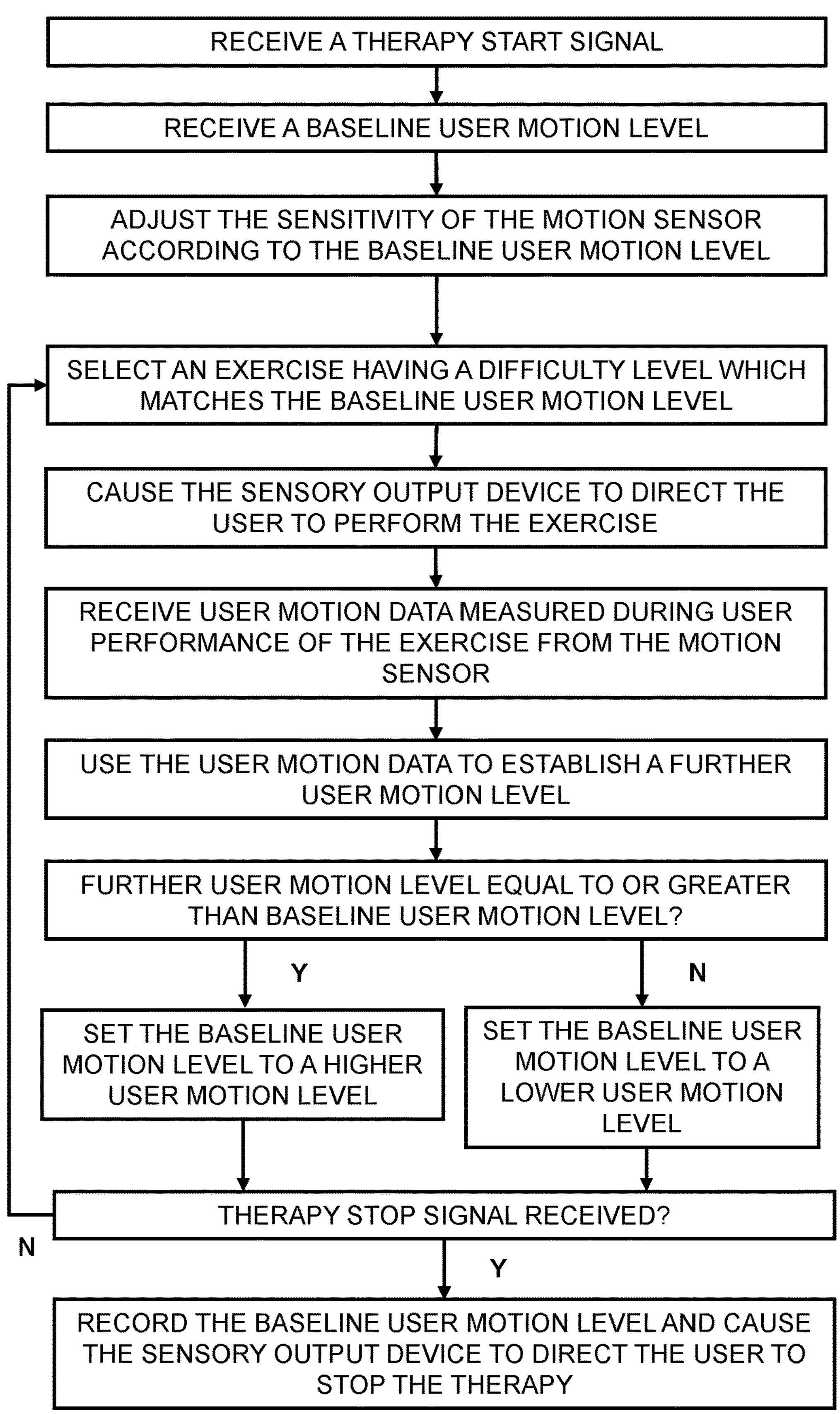
FIG. 2 is a flow diagram of steps carried out by the processor of the system of FIG. 1 for providing a gross motor therapy to a user.

Referring to FIG. 1 and FIG. 2, the processor 13 of the mobile computing device 3 of the system 1 is configured to:

(a) receive a therapy start signal, (b) receive a baseline user motion level, (c) adjust the sensitivity of the motion sensor 5 according to the baseline user motion level, (d) select an exercise having a difficulty level which matches the baseline user motion level, (e) cause the sensory output device 7 to direct the user to perform the exercise, (f) receive user motion data measured during user performance of the exercise from the motion sensor 5, (g) use the user motion data to establish a further user motion level, (h) compare the further user motion level with the baseline user motion level, (i) when the further user motion level is equal to or greater than the baseline user motion level, set the baseline user motion level to a higher user motion level and go to (k), (j) when the further user motion level is less than the baseline user motion level, set the baseline user motion level to a lower user motion level and go to (k), (k) when a therapy stop signal is not received, return to (d), (l) when a therapy stop signal is received, record the baseline user motion level and cause the sensory output device 7 to direct the user to stop the therapy, the method characterised by the steps of:

(m) scanning the mobile computing device 3 to determine the operating system of the mobile computing device 3, (n) determining whether each of the one or more sensors 5 is an accelerometer sensor, a gyroscope sensor or a global positioning system sensor, (o) scanning the one or more sensors 5 to determine which of the sensors 5 are currently available to measure motion data of the user, and (p) using determinations from steps (m), (n) and (o) to further calibrate the sensitivity of the one or more motion sensors 5.

The therapy start signal can comprise a signal input into the mobile computing device by the user.

Receiving the baseline user motion level comprises:

(a) selecting an initial exercise having an initial difficulty level, (b) causing the sensory output device 7 to direct the user to perform the initial exercise, (c) receiving user motion data measured during user performance of the initial exercise from the motion sensor 5, and (d) using the user motion data to establish the baseline user motion level.

Selecting the initial exercise comprises selecting an initial gait exercise having an initial difficulty level which matches a previous user motion level comprising a previous average step frequency of the user.

Causing the sensory output device 7 to direct the user to perform the initial exercise comprises playing an exercise file for the initial gait exercise to the user. This comprises playing a plurality of instructions to direct the user to perform the initial gait exercise. The plurality of instructions comprise a start instruction and a stop instruction to direct the user to start and end the initial gait exercise, comprising any of audio instructions, vibration instructions, visual instructions. For example, the start instruction and the stop instruction comprise audio instructions played to the user via the audio output device 15 of the sensory output device 7 of the mobile computing device 3.

The plurality of instructions further comprise instructions directing the user to perform a walk for 1 min. The instructions to perform the walk comprise audio cues provided to the user during the walk, having a frequency equal to the previous average step frequency of the user.

The audio cues are provided by generating an audio cue file by playing a single audio cue file on a loop at a frequency equal to the previous average step frequency of the user.

It will be appreciated that the instructions to perform the walk may instead comprise vibration cues or visual cues provided to the user during the walk, having a frequency equal to the previous average step frequency of the user.

Receiving user motion data measured during user performance of the initial exercise then comprises receiving user gait motion data measured during performance of the walk of the initial gait exercise.

Using the user motion data to establish the baseline user motion level comprises using the user gait motion data to compute gait step data and using the gait step data to establish the baseline user motion level. The gait step data measures a baseline average step frequency of the user and the baseline user motion level is set to equal the baseline average step frequency of the user, measured in steps per minute.

It will be appreciated that receiving the baseline user motion level may instead comprise receiving a previous baseline user motion level, for example a baseline user motion level recorded at the end of a previous therapy.

The sensitivity of the motion sensor 5 is then adjusted according to the baseline user motion level. This comprises setting a sensitivity level of the motion sensor 5 such that it is able to detect motion of the user at the baseline user motion level.

Calibrating the sensors 5 may further include scanning the mobile computing device 3 to determine the operating system of the mobile computing device 3, determining whether each of the one or more sensors 5 is an accelerometer sensor, a gyroscope sensor or a global positioning system sensor, scanning the one or more sensors 5 to determine which of the sensors 5 are currently available to measure motion data of the user, and using these determinations to further calibrate the sensitivity of the one or more motion sensors 5.

Configuring the system so that it can calibrate the sensors 5 according to the above determinations allows for haptic feedback and basic movement in the mobile device, such as the phone being inside a trouser pocket, causing the screen to be touched, to provide information on sensor sensitivity. Variability is always introduced into device data and the sensors position in space is identified and through automated data processing this is adapted and normalised to enable the system to operate seamlessly when a device is placed in awkward positions, such as upside down or in the jacket pocket. Movement may be estimated to enhance accuracy, for example, sensitivity can be reduced slightly the more oddly placed the phone so this calibration is done every time and the system then draws on data from previous results to support sensitivity.

A walk test assessment or standing balance test is completed to measure movement and calibrate the sensors in the device first and then according to the user. For example, a two-minute walk test may be performed to complete calibration to the phone, however data is showing this process may be completed if standardisation is met within 10-20 seconds with strong prediction accuracy for the remainder of the test.

The gross motor therapy then proceeds to selecting an exercise having a difficulty level which matches the baseline user motion level. This comprises selecting a gait exercise having a difficulty level which matches the baseline user motion level comprising a baseline average step frequency of the user.

The sensory output device 7 then directs the user to perform the gait exercise by playing an exercise file for the gait exercise to the user. This plays a plurality of instructions to direct the user to perform the gait exercise. The instructions include motivational instructions to the user and one or more prompts to user, for example telling the user to place the mobile computing device 3 in a trouser pocket for the gait exercise. The plurality of instructions directing the user to perform the gait exercise comprises a start instruction and an end instruction to direct the user to start and end the gait exercise. The start and end instructions comprise visual instructions output by the visual output device 19 of the sensory output device 7 of the mobile computing device 3.

The plurality of instructions comprise instructions directing the user to perform a walk for 2 min. The instructions to perform the walk comprise vibration cues provided to the user during the walk, having a frequency equal to the baseline average step frequency of the user. The vibration cues are provided by causing the vibration output device 17 of the sensory output device 7 of the mobile computing device 3 to vibrate at a frequency equal to the baseline average step frequency of the user. It will be appreciated that the instructions to perform the walk may comprise audio cues or visual cues provided to the user during the walk.

User gait motion data measured during performance of the walk of the gait exercise is then received and used to establish the further user motion level. This comprises using the user gait motion data to compute gait step data and using the gait step data to establish the further user motion level. The gait step data measures a further average step frequency of the user and the further user motion level is set equal to the further average step frequency of the user.

It will be appreciated that, alternatively, using the user motion data to establish the further user motion level may comprise using the user gait motion data to compute gait step data and gait postural data and using the gait step data to establish a gait step component of the further user motion level and using the gait postural data to establish a gait postural component of the further user motion level.

The further user motion level comprising the further average step frequency of the user is then compared with the baseline user motion level comprising the baseline average step frequency of the user.

When the further user motion level is equal to or greater than the baseline user motion level, i.e. the further average step frequency of the user is equal to or greater than the baseline average step frequency of the user, the baseline user motion level is set to a higher user motion level. This comprises setting the baseline average step frequency of the user to a higher average step frequency of the user, by applying a multiplication factor to the baseline average step frequency of the user. The multiplication factor may comprise any of a 5% increase of the baseline average step frequency of the user, a 10% increase of the baseline average step frequency of the user.

Setting the baseline average step frequency of the user to a higher average step frequency of the user increases the difficulty level of the next exercise. The difficulty level of the next exercise is increased in response to the user succeeding in the current exercise, e.g. managing to complete the current exercise without any failures. Thus the therapy provided to the user by the system is tailored to the user and adaptive to the user's performance.

When the further user motion level is less than the baseline user motion level, i.e. the further average step frequency of the user is equal to or greater than the baseline average step frequency of the user, the baseline user motion level is set to a lower user motion level. This comprises setting the baseline average step frequency of the user to a lower average step frequency of the user by applying a multiplication factor to the baseline average step frequency of the user. The multiplication factor may comprise any of a 5% decrease of the baseline average step frequency of the user, a 10% decrease of the baseline average step frequency of the user.

Setting the baseline average step frequency of the user to a lower average step frequency of the user decreases the difficulty level of the next exercise. The difficulty level of the next exercise is decreased in response to the user not succeeding in the current exercise, e.g. not managing to complete the current exercise without any failures, or not matching steps throughout the exercise, i.e. failures towards the end of the exercise. Thus, again, the therapy provided to the user by the system is tailored to the user and adaptive to the user's performance.

The first part of the gross motor therapy thus starts at a baseline user gait motion level and comprises a number of gait exercises, the difficulty of successive exercises being adaptive in response to the user's performance in a preceding exercise.

In a second part of the gross motor therapy, the therapy exercises comprise component of fitness exercises.

Receiving the baseline user motion level again comprises:

(a) selecting an initial exercise having an initial difficulty level, (b) causing the sensory output device 7 to direct the user to perform the initial exercise, (c) receiving user motion data measured during user performance of the initial exercise from the motion sensor 5, and (d) using the user motion data to establish the baseline user motion level.

Selecting the initial exercise comprises selecting an initial component of fitness exercise having an initial difficulty level which matches a previous user motion level comprising a previous user component of fitness motion level.

The initial component of fitness exercise may comprise any of a balance exercise, a flexibility exercise, an endurance exercise, a strength exercise. The balance exercise may comprise a static balance exercise. The static balance exercise may comprise any of standing still for a specified time period with feet together, standing still for a specified time period with one foot in front of the other. The balance exercise may comprise a dynamic balance exercise. The dynamic balance exercise may comprise a stretch exercise.

The sensory output device 7 then directs the user to perform the initial exercise by playing an exercise file for the initial component of fitness exercise to the user. This plays a plurality of instructions to direct the user to perform the initial component of fitness exercise. The plurality of instructions comprise a start instruction and an end instruction to direct the user to start and end the initial component of fitness exercise. These instructions may comprise any of audio instructions, vibration instructions, visual instructions.

The plurality of instructions to direct the user to perform the initial component of fitness exercise comprises one or more visual cues provided to the user during the initial component of fitness exercise. The one or more visual cues comprise visual images or flashcards illustrating the initial component of fitness exercise to the user. The visual cues are provided to the user by the visual output deice 19 of the sensory output device 7 of the mobile computing device 3.

The initial component of fitness exercise file is selected from a library of component of fitness exercises which are categorised by difficulty level, stored in a memory device of the mobile computing device.

User component of fitness motion data measured during user performance of the initial component of fitness exercise is then received and is used to establish the baseline user motion level comprising a baseline user component of fitness motion level. The user component of fitness motion data comprises any of hip acceleration data, hip rotation data, sway data, coordination data, flexibility data, endurance data, strength data. The hip acceleration data is data in both the transverse and vertical planes and the hip rotation data is data around both the transverse and vertical planes.

Adjusting the sensitivity of the motion sensors 5 according to the baseline user motion level comprises setting a sensitivity level of the motion sensor 5 to detect motion of the user at the baseline user component of fitness motion level.

The therapy then selects an exercise having a difficulty level which matches the baseline user motion level by selecting a component of fitness exercise having a difficulty level which matches the baseline user component of fitness motion level.

The component of fitness exercise may comprise any of a balance exercise, a flexibility exercise, an endurance exercise, a strength exercise. The balance exercise may comprise a static balance exercise. The static balance exercise may comprise any of standing still for a specified time period with feet together, standing still for a specified time period with one foot in front of the other. The balance exercise may comprise a dynamic balance exercise. The dynamic balance exercise may comprise walking one foot in front of the other e.g. tightrope walking.

The sensory output device 7 directs the user to perform the exercise by playing an exercise file for the component of fitness exercise to the user. This plays a plurality of instructions to direct the user to perform the component of fitness exercise. The plurality of instruction include motivational instructions to the user and one or more prompts to user. The plurality of instructions to direct the user to perform the component of fitness exercise comprise a start instruction and an end instruction to direct the user to start and end the component of fitness exercise.

The plurality of instructions to direct the user to perform the component of fitness exercise comprise one or more visual cues provided to the user during the component of fitness exercise. The one or more visual cues comprise visual images or flashcards illustrating the component of fitness exercise.

The component of fitness exercise file is selected from a library of component of fitness exercises which are categorised by difficulty level, stored in a memory device of the mobile computing device.

User component of fitness motion data measured during performance of the component of fitness exercise is received and used to establish a further user motion level comprising a further user component of fitness motion level.

The user component of fitness motion data may comprise any of hip acceleration data, hip rotation data, sway data, coordination data, flexibility data, endurance data, strength data. The hip acceleration data may be data in both the transverse and vertical planes. The hip rotation data may be data around both the transverse and vertical planes.

The further user component of fitness motion level is then compared with the baseline user component of fitness motion level.

When the further user component of fitness motion level is equal to or greater than the baseline component of fitness motion user motion level, the baseline user component of fitness motion level is set to a higher baseline user component of fitness motion level, by applying a multiplication factor to the baseline user component of fitness motion level. The multiplication factor may comprise any of a 5% increase of the baseline user component of fitness motion level, a 10% increase of the baseline user component of fitness motion level.

Setting the baseline user component of fitness motion level to a higher baseline user component of fitness motion level increases the difficulty level of the next exercise. The difficulty level of the next exercise is increased in response to the user succeeding in the current exercise, e.g. managing to complete the current exercise without any failures. Thus the therapy provided to the user by the system is tailored to the user and adaptive to the user's performance.

When the further user component of fitness motion level is less than the baseline user component of fitness motion level, the baseline user component of fitness motion level is set to a lower baseline user component of fitness motion level, by applying a multiplication factor to the baseline user component of fitness motion level. The multiplication factor may comprise any of a 5% decrease of the baseline user component of fitness motion level, a 10% decrease of the baseline user component of fitness motion level.

Setting the baseline user component of fitness motion level to a lower average step frequency of the user decreases the difficulty level of the next exercise. The difficulty level of the next exercise is decreased in response to the user not succeeding in the current exercise, e.g. not managing to complete the current exercise without any failures. Thus, again, the therapy provided to the user by the system is tailored to the user and adaptive to the user's performance.

The second part of the gross motor therapy thus starts at a baseline user component of fitness motion level and comprises a number of component of fitness exercises, the difficulty of successive exercises being adaptive in response to the user's performance in a preceding exercises.

The therapy stop signal comprises a signal generated by the processor on completion of the gross motor therapy.

In a second embodiment of the system 1, the system provides a fine motor therapy and the therapy exercises comprise fine motor exercises. This type of therapy assesses user range of motion of finger and thumb and dexterity, in order to provide tailored and adaptive therapy to improve their range of motion and to assist with writing.

Figure 3:
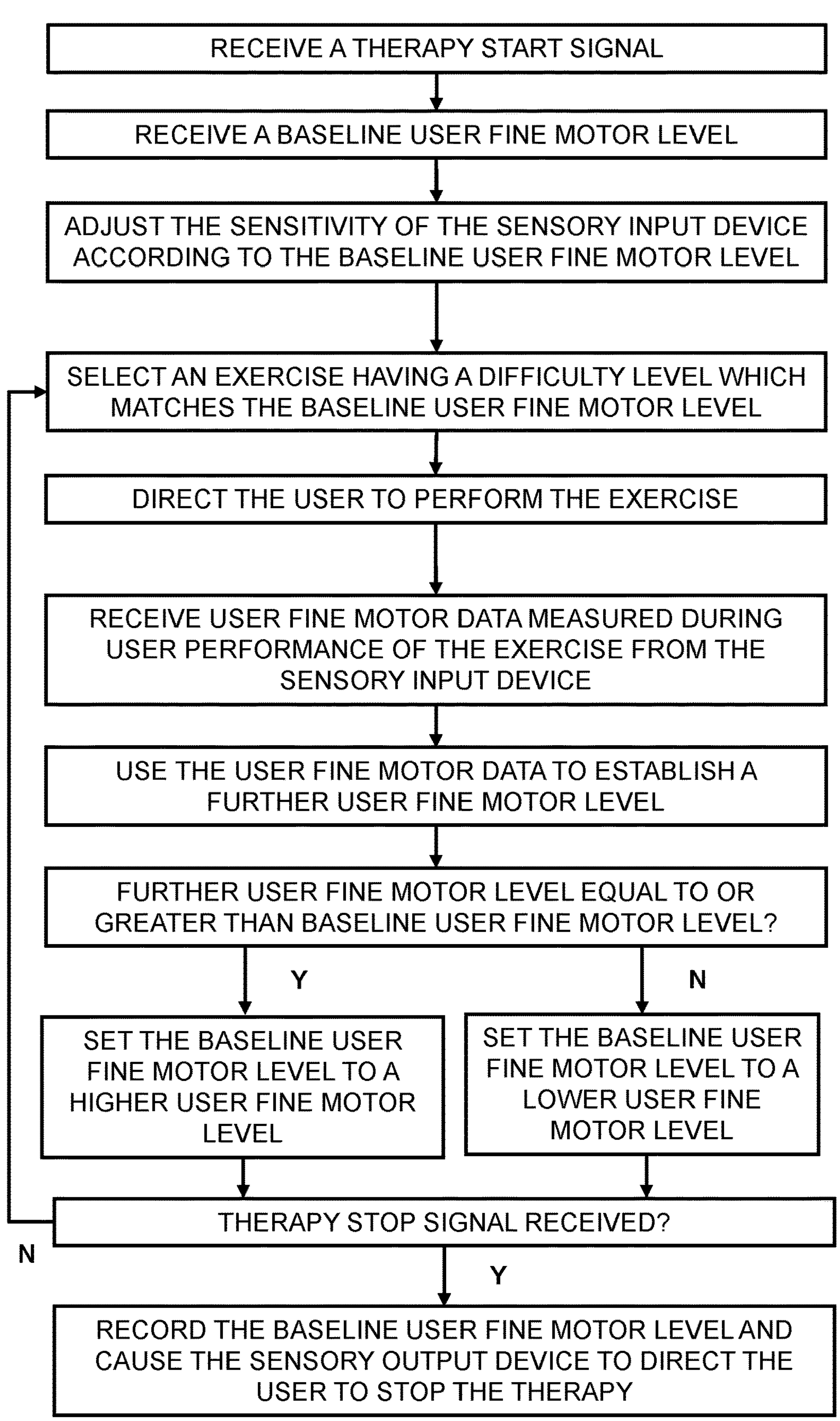
FIG. 3 is a flow diagram of steps carried out by the processor of the system of FIG. 1 for providing a fine motor therapy to a user.

Referring to FIG. 1 and FIG. 3, the processor 13 of the mobile computing device 3 of the therapy system 1 is configured to:

(a) receive a therapy start signal,
(b) receive a baseline user fine motor level,
(c) adjust the sensitivity of the sensory input device 9 according to the baseline user fine motor level,
(d) select an exercise having a difficulty level which matches the baseline user fine motor level,
(e) direct the user to perform the exercise,
(f) receive user fine motor data measured during user performance of the exercise from the sensory input device 9,
(g) use the user fine motor data to establish a further user fine motor level,
(h) compare the further user fine motor level with the baseline user fine motor level,
(i) when the further user fine motor level is equal to or greater than the baseline user fine motor level, set the baseline user fine motor level to a higher user fine motor level and go to
(k),
(j) when the further user fine motor level is less than the baseline user fine motor level, set the baseline user fine motor level to a lower user fine motor level and go to (k),
(k) when a therapy stop signal is not received, return to (d),
(l) when a therapy stop signal is received, record the baseline user fine motor level and cause the sensory output device 7 to direct the user to stop the therapy
(m) pulsing the mobile computing device to determine a measure of vibration delivery latency of the sensory output device,
(n) determining screen size of the sensory output device and whether single and/or double touch of the screen is required as standard,
(o) using the determinations at (m) and (n) together with the determined operating system of the mobile computing device to further calibrate the sensitivity of the sensory input device.

The therapy start signal can comprise a signal input into the mobile computing device by the user. The therapy stop signal comprises a signal generated by the processor on completion of the gross motor therapy.

In this embodiment, receiving the baseline user fine motor level comprises receiving a previous user fine motor level of a previous therapy. When the system provides a first therapy of a day, the previous user fine motor level may comprise a baseline user fine motor level of a previous therapy on a preceding day. When the system provides a second or subsequent therapy of a day, the previous user fine motor level may comprise a baseline user fine motor level of a preceding therapy. The previous user fine motor level of a previous therapy is read from a memory device of the mobile computing device 3.

It will be appreciated that the baseline user fine motor level may instead be received by:

(a) selecting an initial exercise having an initial difficulty level,
(b) directing the user to perform the initial exercise,
(c) receiving user fine motor data measured during user performance of the initial exercise from the sensory input device, and
(d) using the user fine motor data to establish the baseline user fine motor level.

Adjusting the sensitivity of the sensory input device according to the baseline user fine motor level comprises setting a sensitivity level for the device such that it detects when the user moves their thumb and forefinger or a stylus on the device at the baseline user fine motor level.

The sensory input device may be further calibrated by pulsing the mobile computing device to determine a measure of vibration delivery latency of the sensory output device, determining screen size of the sensory output device and whether single and/or double touch of the screen is required as standard, and using the determinations at (m) and (n) together with the determined operating system of the mobile computing device to further calibrate the sensitivity of the sensory input device.

Some post hoc data analysis and standardisation may be performed to validate assumptions in identifying and predicting performance. To fully determine range of motion the system may identify screen size and adjust therapeutic delivery accordingly to ensure standardisation and that screen size as a variable is controlled. Additionally, touch screen features, such as whether the device screen is a double touch or single touch, and is standardised across devices with the selection of single touch. Error tracking, such as latency with stylus or hand touching on the screen, is managed and standardised.

Selecting the exercise having a difficulty level which matches the baseline user fine motor level comprises selecting a fine motor exercise comprising any of a range of motion exercise having a difficulty level which matches the baseline user fine motor level, a dexterity exercise having a difficulty level which matches the baseline user fine motor level, a handwriting exercise having a difficulty level which matches the baseline user fine motor level.

The range of motion exercise may comprise the user interacting with the sensory input device using any of fingers and thumb, a stylus. The range of motion exercise may comprise a finger thumb opposition exercise. The finger thumb opposition exercise may comprise pinching together two objects having a specified separation and angle. The specified separation and angle of the objects may be varied. The specified separation may vary between a maximum and minimum separation as a function of the angle. The finger thumb opposition exercise may comprise pinching a plurality of objects and dragging the objects to a plurality of targets. For example, pinching a plurality of objects and dragging the objects to a plurality of targets may comprise pinching a plurality of pegs and dragging the pegs to a plurality of holes. The range of motion exercise may comprise a first test for a first hand of the user and a second test for a second hand of the user.

The dexterity exercise may comprise rotating an object around one or more moving objects with a finger and thumb or with a stylus. The speed of the one or more moving objects, the size of the one or more moving objects and the number of the one or more moving objects may be varied. The dexterity exercise may comprise a dexterity and motor planning test comprising creating a pathway through a maze-type object from an entry to an exit. Length of the pathway and locations of the entry and exit of the maze-type object may be varied. The dexterity exercise may comprise drawing progressively larger circles around an object or a shape such as letters of the alphabet. The dexterity exercise may comprise a first test for a first hand of the user and a second test for a second hand of the user.

The handwriting exercise may require the user to perform a handwriting task. The handwriting exercise may measure user control of a pen/stylus during the exercise.

The user is then directed to perform the fine motor exercise by causing the touch input device 21 of the sensory input device 9 to display the fine motor exercise to the user. This comprises displaying one or more objects required for the fine motor exercise to the user. This may be displayed in a game incorporating the one or more objects required for the exercise to the user.

The sensory output device 7 plays a plurality of instructions to direct the user to perform the fine motor exercise, comprising any of audio instructions, vibration instructions, visual instructions. The plurality of instructions comprise a start instruction and an end instruction to direct the user to start and end the fine motor exercise. The plurality of instructions further comprise motivational instructions to the user and one or more prompts to user, such as telling the user to use a best hand or their other hand.

User fine motor data measured during user performance of the fine motor exercise is then received. This comprises receiving user fine motor data comprising data for points of contact made by the user on the touch input device 21 of the sensory input device 9 during performance of the fine motor exercise. The data for the points of contact are obtained in approximately 10 seconds.

The data for the points of contact made by the user on the touch input device 21 are used to establish the further user fine motor level, by computing one or more fine motor metrics of the further user fine motor level. The one or more fine motor metrics comprise any of positions of the points of contact, times of the points of contacts, dimensions of the points of contact, changes in the points of contact, range of movement of the user, time taken for a movement by the user, speed of movement of the user, surface area size covered by the user, user dexterity, time taken for completion of a task of the fine motor exercise, number of tasks of the fine motor exercise completed, number of tasks of the fine motor exercise successfully completed, time between completion of a task and commencing a next task.

When the fine motor exercise comprises a range of motion exercise comprising a finger thumb opposition exercise, the one or more fine motor metrics comprise any of average offset between finger/thumb and target on initial contact, range of motion of finger and thumb, range of motion of finger and thumb as a function of hand position, closing of finger and thumb, straightness of path followed on closing finger and thumb, rotation of path followed on closing finger and thumb.

When the fine motor exercise comprises a dexterity exercise comprising creating a pathway through a maze-type object, the one or more fine motor metrics may comprise any of time for completion of the exercise, errors in completion of the exercise, number of pathways taken during the exercise.

When the fine motor exercise comprises a handwriting exercise, the one or more fine motor metrics comprise control of a pen/stylus by the user during the exercise.

The further user fine motor level is then compared with the baseline user fine motor level by comparing one or more fine motor metrics of the further user fine motor level with one or more baseline fine motor metrics of the baseline user fine motor level.

When the further user fine motor level is equal to or greater than the baseline user fine motor level, the baseline user fine motor level is set to a higher user fine motor level by setting one or more baseline fine motor metrics of the baseline user fine motor level to one or more higher fine motor metrics. This comprises applying a multiplication factor to the one or more baseline fine motor metrics. The multiplication factor may comprise any of a 5% increase of the one or more baseline fine motor metrics, a 10% increase of the one or more baseline fine motor metrics. For example, when the fine motor exercise comprises a range of motion exercise comprising a finger thumb opposition exercise, setting the one or more baseline fine motor metrics to one or more higher fine motor metrics comprises increasing separation of objects of the range of motion exercise.

Setting the one or more baseline fine motor metrics to one or more higher fine motor metrics increases the difficulty level of the next fine motor exercise. The difficulty level of the next exercise is increased in response to the user succeeding in the current exercise, e.g. managing to complete the current exercise without any failures. Thus the therapy provided to the user by the system is tailored to the user and adaptive to the user's performance. Increasing the difficulty of the exercise, in response to the user continuing to succeed, is incremental and cumulative, but will ultimately be limited by the touch input device 21 of the sensory input device 9.

When the further user fine motor level is less than the baseline user fine motor level, the baseline user fine motor level is set to a lower user fine motor level by setting one or more baseline fine motor metrics of the baseline user fine motor level to one or more lower fine motor metrics. This comprises applying a multiplication factor to the one or more baseline fine motor metrics. The multiplication factor may comprise any of a 5% decrease of the one or more baseline fine motor metrics, a 10% decrease of the one or more baseline fine motor metrics. For example, when the fine motor exercise comprises a range of motion exercise comprising a finger thumb opposition exercise, setting the one or more baseline fine motor metrics to one or more lower fine motor metrics may comprise decreasing separation of objects of the exercise.

Setting the one or more baseline fine motor metrics to one or more lower fine motor metrics decreases the difficulty level of the next fine motor exercise. The difficulty level of the next exercise is decreased in response to the user not succeeding in the current exercise, e.g. not managing to complete the current exercise without any failures. Thus, again, the therapy provided to the user by the system is tailored to the user and adaptive to the user's performance. Decreasing the difficulty of the exercise, in response to the user continuing not to succeed, is incremental and cumulative, but will ultimately be limited by the touch input device 21 of the sensory input device 9.

The fine motor therapy thus starts at a baseline user fine motor motion level and comprises a number of fine motor exercises, the difficulty of successive exercises being adaptive in response to the user's performance in a preceding exercises. The fine motor exercises are progressively adapted over time to meet the user's needs.

The therapy stop signal comprises a signal generated by the processor on completion of the fine motor therapy.

In a third embodiment of the system 1, the system provides a speech therapy and the therapy exercises comprise speech exercises.

Figure 4:
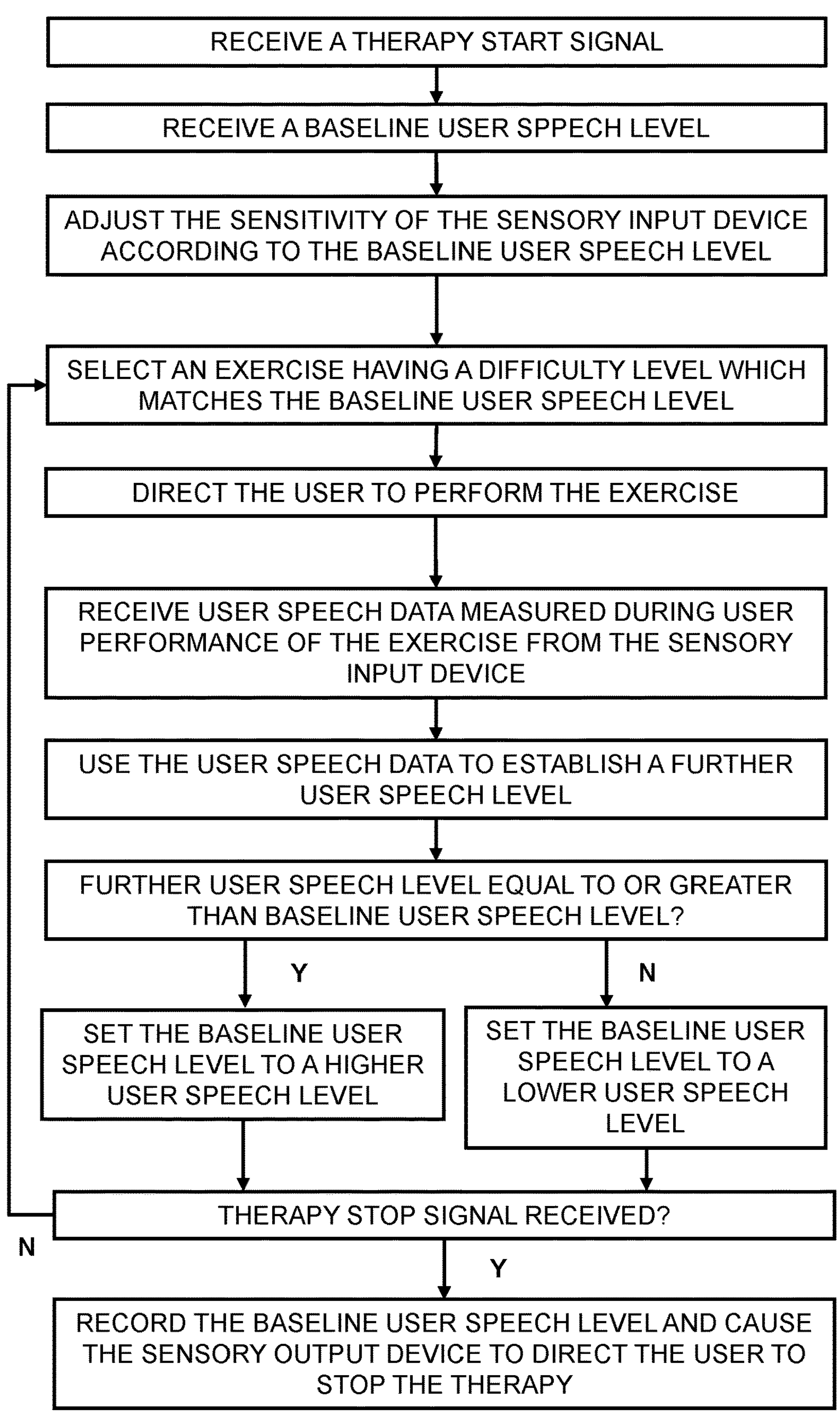
FIG. 4 is a flow diagram of steps carried out by the processor of the system of FIG. 1 for providing a speech therapy to a user.

Referring to FIG. 1 and FIG. 4, the processor 13 of the mobile computing device 3 of the therapy system 1 is configured to:

(a) receive a therapy start signal,
(b) receive a baseline user speech level,
(c) adjust the sensitivity of the sensory input device 9 according to the baseline user speech level,
(d) select a speech exercise having a difficulty level which matches the baseline user speech level,
(e) direct the user to perform the speech exercise,
(f) receive user speech data measured during user performance of the speech exercise from the sensory input device 9,
(g) use the user speech data to establish a further user speech level,
(h) compare the further user speech level with the baseline user speech level,
(i) when the further user speech level is equal to or greater than the baseline user speech level, set the baseline user speech level to a higher user speech level and go to (k),
(j) when the further user speech level is less than the baseline user speech level, set the baseline user speech level to a lower user speech level and go to (k),
(k) when a therapy stop signal is not received, return to (d),
(l) when a therapy stop signal is received, record the baseline user speech level and cause the sensory output device 7 to direct the user to stop the therapy.
(m) playing an initial sound on a speaker 7 of the sensory output device of the mobile computing device to determine the baseline performance of the speaker 7 and to determine any speaker defects,
(n) further calibrating the speaker 7 to the users own voice to provide a starting volume for the speech exercise.

An initial sound is thus played on the device speaker before an exercise to determine the baseline performance of the speaker and also if there are any defects. The system will calibrate the level accordingly so that tailored therapy may be delivered in a standardised way and be comparable across devices whether it be iOS or Android or other. The system then calibrates to the user's voice as a starting point for their first exercise.

The therapy start signal can comprise a signal input into the mobile computing device by the user. The therapy stop signal comprises a signal generated by the processor on completion of the gross motor therapy.

In this embodiment, receiving the baseline user speech level comprises reading the baseline user speech level of a previous therapy from a memory device of the mobile computing device 3.

It will be appreciated that the baseline user speech level may instead be received by:

(a) selecting an initial speech exercise having an initial difficulty level,
(b) directing the user to perform the initial speech exercise,
(c) receiving user speech data measured during user performance of the initial speech exercise from the sensory input device, and
(d) using the user speech data to establish the baseline user speech level.

Adjusting the sensitivity of the sensory input device 9 according to the baseline user speech level comprises setting a volume sensitivity level for an audio input device 23 of the sensory input device 9, such that the audio input device 23 is operable to detect when the user makes a sound at the baseline user speech level. This may allow adaptation for background noise.

Adjusting the sensitivity of the sensory input device 9 according to the baseline user speech level further comprises setting a light sensitivity level for a visual input device 25 of the sensory input device 9, such that the visual input device 25 is operable to detect the face and facial features of the user at the baseline user speech level.

The audio input device 23 is operable to detect audio speech data of the user. It may comprise a microphone integrated with the mobile computing device. The visual input device 25 is operable to detect visual speech data of the user. It may comprise a camera integrated with the mobile computing device.

The mobile computing device 3 is caused to convert sound and facial expression information into electrical signals from the audio input device 23 and the visual input device 25, which independently detect the speaking and facial expression of the user and generate speech data and facial expression data, respectively.

The processor 13 selects the speech exercise having a difficulty level which matches the baseline user speech level by selecting any of a vocal exercise having a difficulty level which matches the baseline user speech level, a facial exercise having a difficulty level which matches the baseline user speech level.

The vocal exercise may comprise any of a text test comprising one or more words or sentences for the user to say, a sound test comprising one or more sounds for the user to say, such as any of 'oooo', 'aaaaa', 'puh', 'tuh', 'kuh', a prosody test comprising assessing non-sound related speech features of the user such as any of pitch, volume, inflection, syllable/word stress, speech rate, tone of the speech of the user, a clarity test comprising assessing intelligibility of speech of the user.

The facial exercise may comprise a facial expression for the user to perform, by, for example, matching and holding the facial expression for a specified time of, for example, 3 seconds. The facial expression may comprise any of puckered lips, smiling, eyebrows up or down, tongue out, tongue out to the right, tongue out to the left, tongue out and up, tongue out and down, open mouth, frowning, scowling, puffed cheeks.

The sensory output device 7 directs the user to perform the speech exercise by playing a speech exercise file for the speech exercise to the user, in this embodiment, selected from a plurality of speech exercise files stored in a memory device of the mobile computing device. This involves playing a plurality of instructions to direct the user to perform the speech exercise. The plurality of instructions will comprise a start and stop instruction to direct the user to start and stop the speech exercise.

When the speech exercise file comprises a vocal exercise file for a vocal exercise, this may comprise a plurality of instructions to direct the user to perform a text test comprising one or more words or sentences for the user say. The plurality of instructions may comprise audio instructions, such as real-time cues, to perform the text test. Additionally or alternatively, the plurality of instructions may comprise visual instructions, such as diagrams of words or sentences, to perform the text test.

The vocal exercise file for a vocal exercise may comprise a plurality of instructions to direct the user to perform a sound test comprising one or more sounds for the user to say. The plurality of instructions may comprise audio instructions, such as real-time cues, to perform the sound test. Additionally or alternatively, the plurality of instructions may comprise visual instructions to perform the sound test, such as any of one or more diagrams of sounds, one or more diagrams of a facial expression making the sound, a target facial image performing a facial expression making the sound.

The vocal exercise file for a vocal exercise may comprise a plurality of instructions to direct the user to perform a prosody test comprising assessing non-sound related speech features of the user. The plurality of instructions may comprise audio instructions, such as real-time cues, to perform the prosody test. Additionally or alternatively, the plurality of instructions may comprise visual instructions to perform the prosody test, such as any of a visual representation of a volume dial for assessing volume of the speech of the user, an item which travels above and below set objects in response to changes in volume of the speech of the user, an item which travels above and below set objects in response to changes in tone of the speech of the user, an item which travels above and below set objects in response to changes in pattern of syllable/word stress of the speech of the user.

The vocal exercise file for a vocal exercise may comprise a plurality of instructions to direct the user to perform a clarity test comprising assessing intelligibility of speech of the user. The plurality of instructions may comprise audio instructions, such as real-time cues, to perform the clarity test. Additionally or alternatively, the plurality of instructions may comprise visual instructions to perform the clarity test, such as one or more diagrams of texts or sounds for the user to perform in the clarity test.

The speech exercise file may comprise a facial exercise file for a facial exercise. The facial exercise file may comprise a plurality of instructions to direct the user to perform a facial expression. The plurality of instructions may comprise audio instructions, such as real-time cues, to perform the facial expression. Additionally or alternatively, the plurality of instructions may comprise visual instructions to perform the facial expression, such as any of one or more diagrams of the facial expression, a target facial image performing the facial expression. The target facial image may be displayed over the face of the user. The user may then see the target facial image performing the facial expression and their face performing the facial expression, thus providing visual feedback to the user.

The sensory input device 9 receives user speech data measured during user performance of the speech exercise comprising user audio speech data and/or user visual speech data. The user speech data is received in a predetermined period of time, preferably approximately seconds.

When the speech exercise comprises a vocal exercise, the audio input device 23 of the sensory input device 9 receives user speech data comprising user audio speech data representing any of text, sound, prosody, clarity of the speech of the user.

When the speech exercise comprises a facial exercise, the visual input device 25 of the sensory input device 9 receives user speech data comprising an image of the user performing a facial expression of the facial exercise. The image of the user may comprise markers placed at key locations of the user face, such as any of edge points and mid points of the upper and lower lip, outline points of the face, corners points and mid points of the eyebrows, corners points and mid points of the eyes. The image of the user may comprise an image of the user performing a facial expression of the facial exercise and a target facial image performing the facial expression.

The processor 13 uses the user speech data to establish the further user speech level by using the data to compute one or more speech metrics of the further user speech level.

When the speech exercise comprises a vocal exercise, user audio speech data is used to compute one or more audio speech metrics of the further user speech level, comprising any of a speaking metric, a prosody metric, a clarity metric. The speaking metric may comprise any of a text speaking metric, a sound speaking metric. The prosody metric may comprise any of a volume prosody metric, a pattern of stress prosody metric, an intonation prosody metric, a speech rate prosody metric. The speech rate prosody metric may be based on a number of sounds made by the user in a specific period of time, e.g. approximately 10 seconds.

When the speech exercise comprises a facial exercise user visual speech data is used to compute one or more visual speech metrics of the further user speech level. The one or more visual speech metrics may comprise one or more facial expression performance metrics. The one or more facial expression performance metrics may be calculated using distance between markers placed on an image of the user performing the facial expression. For example, a facial expression performance metric of a facial expression comprising an open mouth may be calculated using a distance between a marker placed at a mid point of the top lip and a marker placed at a mid point of the bottom lip. If the mid-point of bottom to top lip distance increases, the mouth has been opened.

The one or more facial expression performance metrics may be calculated using an image of the user performing a facial expression of the facial exercise and a target facial image performing the facial expression.

The processor 13 then compares the further user speech level with the baseline user speech level by comparing one or more speech metrics of the further user speech level with one or more baseline speech metrics of the baseline user speech level.

When the further user speech level is equal to or greater than the baseline user speech level, the baseline user speech level is set to a higher user speech level by setting one or more baseline speech metrics of the baseline user speech level to one or more higher speech metrics, by applying a multiplication factor to the one or more baseline speech metrics. The multiplication factor may comprise any of a 5% increase of the one or more baseline speech metrics, a 10% increase of the one or more baseline speech metrics.

When the further speech motor level is less than the baseline user speech level, the baseline user speech level is set to a lower user speech level by setting one or more baseline speech metrics of the baseline user speech level to one or more lower speech metrics, by applying a multiplication factor to the one or more baseline speech metrics. The multiplication factor may comprise any of a 5% decrease of the one or more baseline speech metrics, a 10% decrease of the one or more baseline speech metrics.

For example, when the speech exercise performed by the user comprises a facial exercise comprising a smile, the therapy may identify that the left side of the face can move only 5% from a baseline position. The baseline user speech level is then set to a higher user speech level by setting a smile baseline speech metric to a higher smile speech metric, by applying a 5% multiplication factor to the smile baseline speech metric. If the higher smile baseline speech metric is consistently attained, the smile baseline speech metric is increased. If the higher smile baseline speech metric is not consistently attained, the smile baseline speech metric is decreased.

It is to be understood that the invention is not limited to the specific details described herein which are given by way of example only and that various modifications and alterations are possible without departing from the scope of the invention as defined in the appended claims.

The invention claimed is:

1. A system for providing a therapy to a user including:
- at least one motion sensor configured to measure motion data of the user,
- a mobile computing device that receives the motion data, the mobile computing device including a sensory output device that provides directions to the user in the performance of exercises, and
- wherein said mobile computing device includes at least one processor configured to:
- (1a) receive a therapy start signal,
- (1b) receive a baseline user motion level,
- (1c) adjust the sensitivity of the at least one motion sensor according to the baseline user motion level,
- (1d) select an exercise having a difficulty level which matches the baseline user motion level,
- (1e) cause the sensory output device to direct the user to perform the exercise,
- (1f) receive user motion data measured during user performance of the exercise from the at least one
- (1g) use the user motion data to establish a further user motion level,
- (1h) compare the further user motion level with the baseline user motion level,
- (1i) when the further user motion level is at least as great as the baseline user motion level, set the baseline user motion level to a higher user motion level and go to (1k),
- (1j) when the further user motion level is less than the baseline user motion level, set the baseline user motion level to a lower user motion level and go to (1k),
- (1k) when a therapy stop signal is not received, return to (1d),
- (1l) when a therapy stop signal is received, record the baseline user motion level and cause the sensory output device to direct the user to stop the therapy,
- (1m) scan the mobile computing device to determine the operating system of the mobile computing device,
- (1n) determine whether the at least one motion sensor is selected from a group consisting of an accelerometer sensor, a gyroscope sensor and a global positioning system sensor,
- (1o) scan the at least one motion sensor to determine which of the sensors are currently available to measure motion data of the user, and
- (1p) use determinations from steps (1m), (1n) and (1o) to further calibrate the sensitivity of the at least one motion sensor.

2. The system according to claim 1 wherein the user has a baseline average step frequency and (1d) includes selecting a gait exercise having a difficulty level which matches the baseline user motion level including the baseline average step frequency of the user.

3. The system according to claim 2 in which (1e) includes causing the sensory output device to play an exercise file for the gait exercise to the user including instructions directing the user to perform a walk for a specified time period including audio cues provided to the user during the walk having a frequency equal to the baseline average step frequency of the user.

4. The system according to claim 3 in which (1f) includes receiving user gait motion data measured during performance of the walk of the gait exercise.

5. The system according to claim 4 in which (1g) includes using the user gait motion data to compute gait step data, using the gait step data to measure a further average step frequency of the user and setting the further user motion level equal to the further average step frequency of the user.

6. The system according to claim 5 in which (1h) includes comparing the further average step frequency of the user with the baseline average step frequency of the user.

7. The system according to claim 6 in which when the further user motion level is at least as great as the baseline user motion level, setting the baseline user motion level to a higher user motion level includes setting the baseline average step frequency of the user to a higher average step frequency of the user and when the further user motion level is less than the baseline user motion level, setting the baseline user motion level to a lower user motion level includes setting the baseline average step frequency of the user to a lower average step frequency of the user.

8. The system according to claim 1, further including a sensory input device connected to the mobile computing device and the at least one processor of the mobile computing device being further configured to:
- (8b) receive a baseline user fine motor level,
- (8c) adjust the sensitivity of the sensory input device according to the baseline user fine motor level,
- (8d) select an exercise having a difficulty level which matches the baseline user fine motor level,
- (8e) direct the user to perform the exercise,
- (8f) receive user fine motor data measured during user performance of the exercise from the sensory input device,
- (8g) use the user fine motor data to establish a further user fine motor level,
- (8h) compare the further user fine motor level with the baseline user fine motor level,
- (8i) when the further user fine motor level is at least as great as the baseline user fine motor level, set the baseline user fine motor level to a higher user fine motor level and go to (8k), (8j) when the further user fine motor level is less than the baseline user fine motor level, set the baseline user fine motor level to a lower user fine motor level and go to (8k), (8k) when a therapy stop signal is not received, return to (8d), (8l) when a therapy stop signal is received, record the baseline user fine motor level and cause the sensory output device to direct the user to stop the therapy, (8m) pulsing the mobile computing device to determine a measure of vibration delivery latency of the sensory output device, (8n) determining screen size of the sensory output device and whether single and/or double touch of the screen is required as standard, (8o) using the determinations at (8m) and (8n) together with the determined operating system of the mobile computing device to further calibrate the sensitivity of the sensory input device.

9. The system according to claim 8 in which (8d) includes selecting any of a range of motion exercises having a difficulty level which matches the baseline user fine motor level, a dexterity exercise having a difficulty level which matches the baseline user fine motor level, a handwriting exercise having a difficulty level which matches the baseline user fine motor level.

10. The system according to claim 9 in which (8f) includes receiving the user fine motor data including data for points of contact made by the user on the sensory input device during performance of the exercise.

11. The system according to claim 10 in which (8g) includes using the data for the points of contact made by the user on the sensory input device to compute fine motor metrics of the further user fine motor level including any of positions of the points of contact, times of the points of contacts, dimensions of the points of contact, changes in the points of contact, range of movement of the user, time taken for a movement by the user, speed of movement of the user, control of movement of the user, surface area size covered by the user, user dexterity.

12. The system according to claim 11 in which when the further user fine motor level is at least as great as the baseline user fine motor level, setting the baseline user fine motor level to a higher user fine motor level includes setting at least one baseline fine motor metric of the baseline user fine motor level to at least one higher fine motor metric and when the further user fine motor level is less than the baseline user fine motor level, setting the baseline user fine motor level to a lower user fine motor level including setting at least one baseline fine motor metric of the baseline user fine motor level to at least one lower fine motor metric.

13. The system according to claim 1 in which the at least one processor of the mobile computing device is configured to:

(13b) receive a baseline user speech level, (13c) adjust the sensitivity of the sensory input device according to the baseline user speech level, (13d) select a speech exercise having a difficulty level which matches the baseline user speech level, (13e) direct the user to perform the speech exercise, (13f) receive user speech data measured during user performance of the speech exercise from the sensory input device, (13g) use the user speech data to establish a further user speech level, (13h) compare the further user speech level with the baseline user speech level, (13i) when the further user speech level is at least as great as the baseline user speech level, set the baseline user speech level to a higher user speech level and go to (13k), (13j) when the further user speech level is less than the baseline user speech level, set the baseline user speech level to a lower user speech level and go to (13k), (13k) when a therapy stop signal is not received, return to (13d), (13l) when a therapy stop signal is received, record the baseline user speech level and cause the sensory output device to direct the user to stop the therapy, (13m) playing an initial sound on a speaker of the sensory output device of the mobile computing device to determine the baseline performance of the speaker and to determine any speaker defects, and (13n) further calibrating the speaker according to the determination at step (13m) and to the user's own voice to provide a starting volume for the speech exercise.

14. The system according to claim 13 in which (13d) includes selecting any of a vocal exercise having a difficulty level which matches the baseline user speech level, a facial exercise having a difficulty level which matches the baseline user speech level.

15. The system according to claim 14 in which (13f) includes any of receiving user speech data including user audio speech data representing any of text, sound, prosody, clarity of the speech of the user, user speech data including user visual speech data including an image of the user performing a facial expression of a facial exercise.

16. The system according to claim 15 in which (13g) includes using the data to compute at least one speech metric of the further user speech level, said at least one speech metric selected from the group consisting of a speaking metric, a prosody metric, a clarity metric, and at least one facial expression performance metric.

17. The system according to claim 16 in which when the further user speech level is at least as great as the baseline user speech level, setting the baseline user speech level to a higher user speech level including setting at least one baseline speech metric of the baseline user speech level to at least one higher speech metric and when the further speech motor level is less than the baseline user speech level, setting the baseline user speech level to a lower user speech level including setting at least one baseline speech metric of the baseline user speech level to at least one lower speech metric.

18. A method of providing a therapy to a user including steps of:

(18a) receiving a therapy start signal, (18b) receiving a baseline user motion level, (18c) adjusting the sensitivity of at least one motion sensor according to the baseline user motion level, (18d) selecting an exercise having a difficulty level which matches the baseline user motion level, (18e) causing a sensory output device to direct the user to perform the exercise, (18f) receiving user motion data measured during user performance of the exercise from the at least one motion sensor, (18g) using the user motion data to establish a further user motion level, (18h) comparing the further user motion level with the baseline user motion level, (18i) when the further user motion level is at least as great as the baseline user motion level, setting the baseline user motion level to a higher user motion level and go to (18k), (18j) when the further user motion level is less than the baseline user motion level, setting the baseline user motion level to a lower user motion level and go to (18k), (18k) when a therapy stop signal is not received, returning to (18d), (18l) when a therapy stop signal is received, recording the baseline user motion level and causing the sensory output device to direct the user to stop the therapy, (18n) determining whether each of the at least one sensor is selected from a group including an accelerometer sensor, a gyroscope sensor and a global positioning system sensor, (18o) scanning the at least one sensor to determine which of the at least one sensor is currently available to measure motion data of the user, and (18p) using determinations from steps (18m), (18n) and (18o) to further calibrate the sensitivity of the at least one motion sensor.

19. The method as claimed in claim 18, further including steps of:

(19b) receiving a baseline user fine motor level, (19c) adjusting the sensitivity of a sensory input device according to the baseline user fine motor level, (19d) selecting an exercise having a difficulty level which matches the baseline user fine motor level, (19e) directing the user to perform the exercise, (19f) receiving user fine motor data measured during user performance of the exercise from the sensory input device, (19g) using the user fine motor data to establish a further user fine motor level, (19h) comparing the further user fine motor level with the baseline user fine motor level, (19i) when the further user fine motor level is at least as great as the baseline user fine motor level, setting the baseline user fine motor level to a higher user fine motor level and go to (19k), (19j) when the further user fine motor level is less than the baseline user fine motor level, setting the baseline user fine motor level to a lower user fine motor level and go to (19k), (19k) when a therapy stop signal is not received, return to (19d), (19l) when a therapy stop signal is received, recording the baseline user fine motor level and causing a sensory output device to direct the user to stop the therapy, (19m) pulsing the mobile computing device to determine a measure of vibration delivery latency of the sensory output device, (19n) determining screen size of the sensory output device and whether single and/or double touch of the screen is required as standard, (19o) using the determinations at (19m) and (19n) together with the determined operating system of the mobile computing device to further calibrate the sensitivity of the sensory input device.

20. The method as claimed in claim 18, further including steps of:

(20b) receive a baseline user speech level, (20c) adjust the sensitivity of the sensory input device according to the baseline user speech level, (20d) select a speech exercise having a difficulty level which matches the baseline user speech level, (20e) direct the user to perform the speech exercise, (20f) receive user speech data measured during user performance of the speech exercise from the sensory input device, (20g) use the user speech data to establish a further user speech level, (20h) compare the further user speech level with the baseline user speech level, (20i) when the further user speech level is at least as great as the baseline user speech level, set the baseline user speech level to a higher user speech level and go to (20k), (20j) when the further user speech level is less than the baseline user speech level, set the baseline user speech level to a lower user speech level and go to (20k), (20k) when a therapy stop signal is not received, return to (20d), (20l) when a therapy stop signal is received, record the baseline user speech level and cause the sensory output device to direct the user to stop the therapy, (20m) playing an initial sound on a speaker of the sensory output device of the mobile computing device to determine the baseline performance of the speaker and to determine any speaker defects, and (20n) further calibrating the speaker according to the determination at step (20m) and to the user's own voice to provide a starting volume for the speech exercise.

* * * * *